(12) United States Patent
Sayers et al.

(10) Patent No.: US 10,550,007 B2
(45) Date of Patent: Feb. 4, 2020

(54) COMPOSITIONS CONTAINING DOPED NICKELATE COMPOUNDS

(71) Applicant: FARADION LIMITED, Sheffield, South Yorkshire (GB)

(72) Inventors: Ruth Sayers, Sheffield (GB); Jeremy Barker, Chipping Norton (GB); Richard Heap, Abingdon (GB)

(73) Assignee: FARADION LIMITED, Sheffield (GB)

( * ) Notice: Subject to any disclaimer, the term of this patent is extended or adjusted under 35 U.S.C. 154(b) by 0 days.

(21) Appl. No.: 16/208,805

(22) Filed: Dec. 4, 2018

(65) Prior Publication Data

US 2019/0100441 A1 Apr. 4, 2019

Related U.S. Application Data

(63) Continuation of application No. 15/313,280, filed as application No. PCT/GB2015/051482 on May 20, 2015, now Pat. No. 10,196,280.

(30) Foreign Application Priority Data

May 22, 2014 (GB) .................................. 1409163.1

(51) Int. Cl.
*H01M 4/505* (2010.01)
*C01G 53/00* (2006.01)
(Continued)

(52) U.S. Cl.
CPC ............. *C01G 53/40* (2013.01); *C01G 53/50* (2013.01); *C01G 53/66* (2013.01); *G02F 1/155* (2013.01);
(Continued)

(58) Field of Classification Search
None
See application file for complete search history.

(56) References Cited

U.S. PATENT DOCUMENTS 9,917,307 B2 3/2018 Barker et al.
2004/0110063 A1 6/2004 Uchitomi et al.
(Continued)

FOREIGN PATENT DOCUMENTS

CN 1610152 4/2005
CN 101043093 9/2007
(Continued)

OTHER PUBLICATIONS

Buchholz, D., Chagas, L. G., Winter, M., & Passerini, S. (2013). P2-type layered Na0.45Ni0.22Co0.11Mn0.66O2 as Intercalation host material for lithium and sodium batteries. Electrochimica Acta, 110, 208-213.
(Continued)

*Primary Examiner* — Wyatt P McConnell
(74) *Attorney, Agent, or Firm* — Meunier Carlin & Curfman LLC

(57) ABSTRACT

The invention relates to electrodes comprising doped nickelate-containing compositions comprising a first component-type comprising one or more components with an O3 structure of the general formula: $A_aM^1_vM^2_wM^3_xM^4_yM^5_zO_2$ wherein A comprises one or more alkali metal selected from sodium, lithium and potassium $M^1$ is nickel in oxidation state 2+, $M^2$ comprises one or more metals in oxidation state 4+, $M^3$ comprises one or more metals in oxidation state 2+, $M^4$ comprises one or more metals in oxidation state 4+, and $M^5$ comprises one or more metals in oxidation state 3+ wherein $0.85 \leq a \leq 1$; $0 < v < 0.5$; at least one of w and y is $>0$; $x \geq 0$; $z \geq 0$; and wherein a, v, w, x, y and z are chosen to maintain electroneutrality; together with one or more component-types selected from a second component-type comprising one or more components with a P2 structure of the general formula: $A'_a < M^{1'}v M^{2'}w M^{3'}x' < M^{4'}y' < M^{5'}z'O_2$ wherein A' comprises
(Continued)

one or more alkali metal selected from sodium, lithium and potassium; $M^{1'}$ is nickel in oxidation state 2+, $M^{2'}$ comprises one or more metals in oxidation state 4+, $M^{3'}$ comprises one or more metals in oxidation state 2+, $M^{4'}$ comprises one or more metals in oxidation state 4−, and $M^{5'}$ comprises one or more metals in oxidation state 3+ wherein $0.4 \leq a' < 1$; $0 < v' < 0.5$; at least one of w' and y' is >0; $x' \geq 0$, preferably $x' > 0$; $z' > 0$; and wherein a', v', w', x', y' and z' are chosen to maintain electroneutrality; and a third component-type comprising one or more components with a P3 structure of the general formula: $A''_{a''} M1''_{v''} M2''_{w''} M3''_{x''} M4''_{y''} M5''_{z''} O_2$ wherein A'' comprises one or more alkali metals selected from sodium, lithium and potassium; $M^{1''}$ is nickel in oxidation state 2+, $M^{2''}$ comprises one or more metals in oxidation state 4+, $M^{3''}$ comprises one or more metals in oxidation state 2−, $M^{4''}$ comprises one or more metals in oxidation state 4+, and $M^{5''}$ comprises one or more metals in oxidation state 3+ wherein $0.4 \leq a'' < 1$, $0 < v'' < 0.5$, At least one of w'' and y'' is >0; $x'' \geq 0$; $z'' \geq 0$; and wherein a'', v'', w'', x'', y'' and z'' are chosen to maintain electroneutrality.

9 Claims, 26 Drawing Sheets

(51) Int. Cl.
  H01M 4/525 (2010.01)
  H01M 10/0525 (2010.01)
  H01M 10/054 (2010.01)
  G02F 1/155 (2006.01)
  H01M 4/131 (2010.01)
  H01M 10/052 (2010.01)

(52) U.S. Cl.
  CPC ........... H01M 4/131 (2013.01); H01M 4/505 (2013.01); H01M 4/525 (2013.01); H01M 10/052 (2013.01); H01M 10/054 (2013.01); H01M 10/0525 (2013.01); *C01P 2002/72* (2013.01); *C01P 2006/40* (2013.01)

(56) References Cited

U.S. PATENT DOCUMENTS

| | | |
|---|---|---|
| 2007/0218359 A1 | 9/2007 | Shimizu et al. |
| 2007/0218361 A1 | 9/2007 | Inoue et al. |
| 2007/0224506 A1 | 9/2007 | Ooyama et al. |
| 2010/0104944 A1 | 4/2010 | Saito et al. |
| 2012/0183837 A1 | 7/2012 | Johnson et al. |
| 2013/0224588 A1 | 8/2013 | Kageura et al. |
| 2014/0131617 A1 | 5/2014 | Park |
| 2017/0174527 A1 | 6/2017 | Barker et al. |

FOREIGN PATENT DOCUMENTS

| | | |
|---|---|---|
| CN | 102341941 | 2/2012 |
| GB | 2503896 A | 1/2014 |
| GB | 2506859 A | 4/2014 |
| JP | 2003242976 | 8/2003 |
| JP | 2010129509 A | 6/2010 |
| JP | 2012206925 A | 10/2012 |
| JP | 2013175311 A | 9/2013 |
| JP | 2014160653 A | 9/2014 |
| JP | 2015176678 A | 10/2015 |
| WO | 2008081839 A1 | 7/2008 |
| WO | 2011129419 A1 | 10/2011 |
| WO | 2013073633 A1 | 5/2013 |
| WO | 2013118661 A1 | 8/2013 |
| WO | 2013140174 | 9/2013 |
| WO | 2014009710 A1 | 1/2014 |
| WO | 2014009722 A1 | 1/2014 |
| WO | 2014009723 A1 | 1/2014 |
| WO | 2014009724 A1 | 1/2014 |
| WO | 2014057258 A1 | 4/2014 |
| WO | 2014077663 A1 | 5/2014 |

OTHER PUBLICATIONS

Chagas, L. G., Buchholz, D., Wu, L., Vortmann, B., & Passerini, S. (2014). Unexpected performance of layered sodium-ion cathode material in ionic liquid-based electrolyte. Journal of Power Sources, 247, 377-383.

Delmas, C., Fouassier, C., & Hagenmuller, P. (1980). Structural classification and properties of the layered oxides. Physica B+ C, 99(1), 81-85.

International Preliminary Report on Patentability of the International Preliminary Examining Authority, Application No. PCT/GB2015/051482, dated Jul. 19, 2016, 6 pages.

International Search Report and Written Opinion of the International Searching Authority, Application No. PCT/GB2015/051482, dated Jul. 24, 2015, 11 pages.

Kim, D. et al. (2011). Enabling Sodium Batteries Using Lithium-Substituted Sodium Layered Transition Metal Oxide Cathodes. Advanced Energy Materials, 1(3), 333-336.

Kim et al. 2014. Approaching the Theoretical Capacities of LiMnBO3. Abstract of presentation given at 17th International Meeting on Lithium Batteries, Jun. 10-14, 2014. Como, Italy.

Lee, D. H., Xu, J., & Meng, Y. S. (2013). An advanced cathode for Na-ion batteries with high rate and excellent structural stability. Physical Chemistry Chemical Physics, 15(9), 3304-3312.

Lu, Z., & Dahn, J. R. (2001). Can All the Lithium be Removed from T2Li2/3[Ni1/3Mn2/3]O2?. Journal of the Electrochemical Society, 148(7), A710-A715.

Pollet, M., Blangero, M., Doumerc, J. P., Decourt, R., Carlier, D., Denage, C., & Delmas, C. (2009). Structure and properties of alkali cobalt double oxides A0.6CoO2 (A= Li, Na, and K). Inorganic chemistry, 48(20), 9671-9683.

Search Report of the GB Intellectual Property Office, Application No. GB1409163.1, dated Nov. 25, 2014, 5 pages.

Search Report of the GB Intellectual Property Office—Amended, Application No. GB1409163.1, dated Dec. 2, 2014, 3 pages.

Shin, Y. J., & Yi, M. Y. (2000). Preparation and structural properties of layer-type oxides NaxNix/2Ti1-x/2O2 ($0.60 \leq x \leq 1.0$). Solid State Ionics, 132(1), 131-141.

Smirnova, O. A., Avdeev, M., Nalbandyan, V. B., Kharton, V. V., & Marques, F. M. B. (2006). First observation of the reversible O3↔P2 phase transition: Crystal structure of the quenched high-temperature phase Na0.74Ni0.58Sb0.42O2. Materials Research Bulletin, 41(6), 1056-1062.

Tournadre, F., Croguennec, L., Saadoune, I., Carlier, D., Shao-Horn, Y., Willmann, P., & Delmas, C. (2004). On the mechanism of the P2-Na0.70CoO2→O2-LiCoO2 exchange reaction—Part I: proposition of a model to describe the P2-O2 transition. Journal of Solid State Chemistry, 177(8), 2790-2802.

Wang, H., Yang, B., Liao, X. Z., Xu, J., Yang, D., He, Y. S., & Ma, Z. F. (2013). Electrochemical properties of P2-Na 2/3[Ni1/3Mn2/3]O2 cathode material for sodium ion batteries when cycled in different voltage ranges. Electrochimica Acta, 113, 200-204.

Yabuuchi, N. et al. (2012). P2-type Nax [Fe1/2Mn1/2] O2 made from earth-abundant elements for rechargeable Na batteries. Nature materials, 11(6), 512-517.

Yuan, D. et al. (2014). P2-type Na0.67Mn0.65Fe0.2Ni0.15O2 cathode material with high-capacity for sodium-ion battery. Electrochimica Acta, 116, 300-305.

International Preliminary Report on Patentability of the International Preliminary Examining Authority, Application No. PCT/GB2015/051495, dated May 2, 2016, 5 pages.

International Search Report and Written Opinion of the International Searching Authority, Application No. PCT/GB2015/051495, dated Jul. 17, 2015, 9 pages.

Search Report of the GB Intellectual Property Office, Application No. GB1421105.6, dated May 26, 2015, 4 pages.

(56) References Cited

OTHER PUBLICATIONS

Lei, Y. et al. (2014). Synthesis and Stoichiometry of Different Layered Sodium Cobalt Oxides. Chemistry of Materials, 26, 5288-5296.

Han, M.H. et al. (2015). A comprehensive review of sodium layered oxides: powerful cathodes for Na-ion batteries. Energy Environ. Sci., 8, 81-102.

First Office Action issued by the State Intellectual Property Office for the People's Republic of China in connection with Chinese Application No. 201580026390.2, dated Jun. 23, 2017.

Office Action issued in connection with U.S. Appl. No. 15/313,201, dated Nov. 3, 2017.

First Office Action and Search Report issued in connection with Chinese Application No. 201580025425.0, dated Jun. 26, 2017, with English translation attached.

First Office Action and Search Report issued in connection with Chinese Application No. 201580004079.8, dated Feb. 20, 2017, with English translation attached.

International Search Report and Written Opinion issued by the International Searching Authority for Application No. PCT/GB2015/050023 dated May 8, 2015.

International Preliminary Report on Patentability issued by the International Preliminary Examining Authority for Application No. PCT/GB2015/050023 dated Jan. 28, 2016.

Search Report and Written Opinion of the GB Intellectual Property Office from Application No. GB1400347.9 dated Jul. 10, 2014.

Search Report and Written Opinion of the GB Intellectual Property Office from Application No. GB1400347.9 dated Feb. 9, 2015.

Gotoh, Kazuma, Toru Ishikawa, Saori Shimadzu, Naoaki Yabuuchi, Shinichi Komaba, Kazuyuki Takeda, Atsushi Goto et al. "NMR study for electrochemically inserted Na in hard carbon electrode of sodium ion battery." Journal of power sources 225 (2013): 137-140.

Komaba, S., Ishikawa, T., Yabuuchi, N., Murata, W., Ito, A., & Ohsawa, Y. (2011). "Fluorinated ethylene carbonate as electrolyte additive for rechargeable Na batteries." ACS applied materials & interfaces, 3(11) (2011), 4165-4168.

Komaba, Shinichi, Wataru Murata, Toru Ishikawa, Naoaki Yabuuchi, Tomoaki Ozeki, Tetsuri Nakayama, Atsushi Ogata, Kazuma Gotoh, and Kazuya Fujiwara. "Electrochemical Na insertion and solid electrolyte interphase for hard-carbon electrodes and application to Na-Ion batteries." Advanced Functional Materials 21 (2011): 3859-3867.

Komaba, Shinichi, Naoaki Yabuuchi, Tetsuri Nakayama, Atsushi Ogata, Toru Ishikawa, and Izumi Nakai. "Study on the Reversible Electrode Reaction of Na1-x Ni0. 5Mn0. 5O2 for a Rechargeable Sodium-Ion Battery." Inorganic chemistry 51, No. 11 (2012): 6211-6220.

Lu, Z., & Dahn, J. R. "Understanding the anomalous capacity of Li/Li [Ni x Li (1/3− 2x/3) Mn (2/3− x/3)] O 2 cells using in situ X-ray diffraction and electrochemical studies." Journal of the Electrochemical Society, 149(7) (2002), A815-A822.

Office Action issued in connection with U.S. Appl. No. 15/313,201, dated Aug. 27, 2018.

Notice of Allowance issued in connection with U.S. Appl. No. 15/313,201, dated Nov. 21, 2018.

English Translation of Japanese Office Action issued in JP 2016-568408, dated Sep. 13, 2018.

Komaba et al., Structural and electrochemical behaviors of metastable Li2/3[Ni1/3Mn2/3]O2 modified by metal element substitution, Electrochimica Acta, Nov. 13, 2008, vol. 54, p. 2353-2359.

Zhao et al., A new route for the synthesis of Li2MnO3 based cathode material with enhanced first cycle efficiency and cycleability for lithium ion batteries, Journal of Power Sources, Mar. 26, 2014, vol. 261, p. 324-331.

Office Action issued in connection with U.S. Appl. No. 15/110,647, dated Jan. 7, 2019.

English Translation of JP Office Action issued in JP 2016-545866, dated Aug. 28, 2018.

English Translation of Japanese Office Action issued in JP2016-568825, dated May 21, 2019.

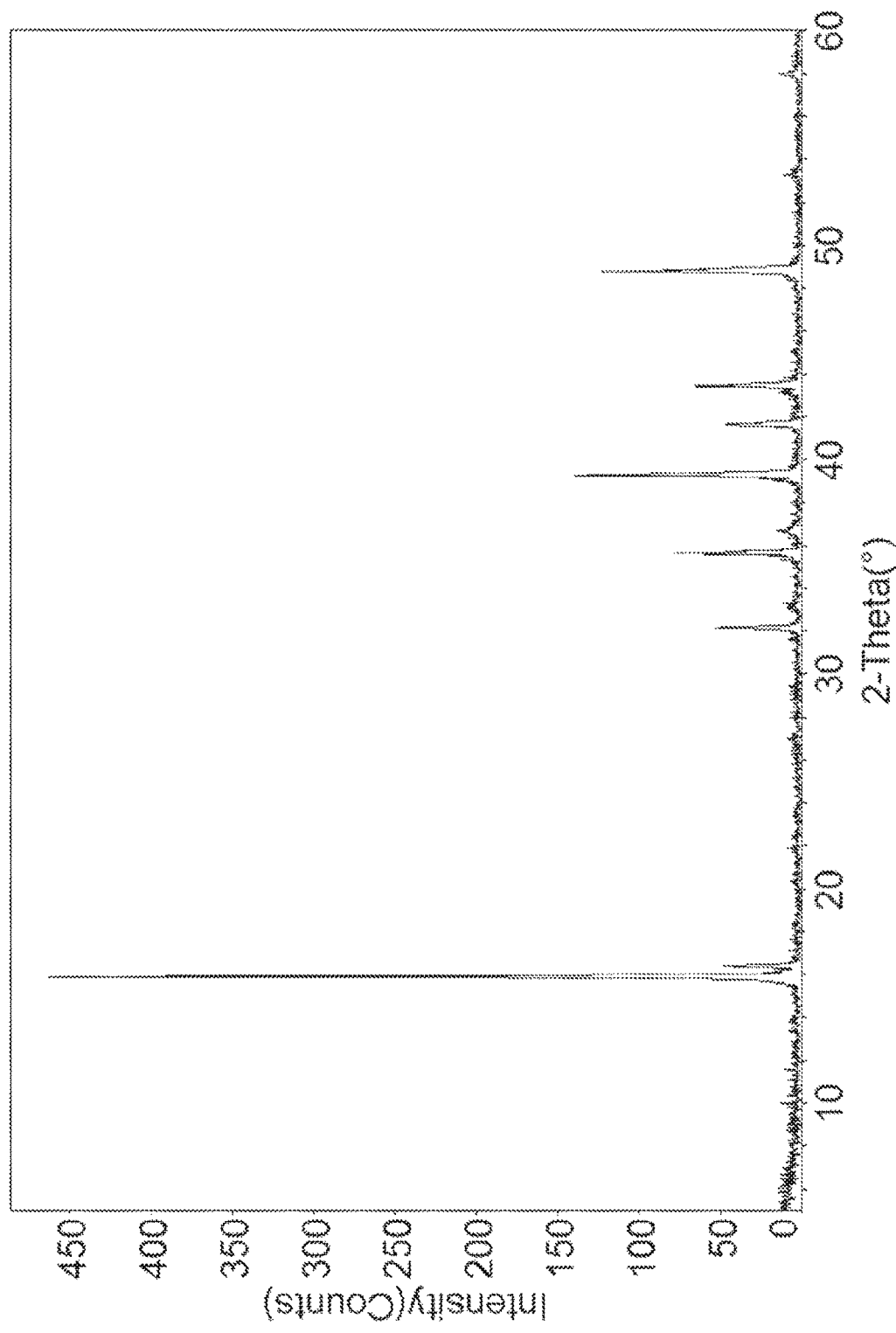

US 10,550,007 B2

COMPOSITIONS CONTAINING DOPED NICKELATE COMPOUNDS

CROSS REFERENCE OF RELATED APPLICATIONS

This application is a continuation of U.S. patent application Ser. No. 15/313,280, filed Nov. 22, 2016, which is a United States National Phase Application under 35 U.S.C. § 371of International Application No. PCT/GB2015/051482, filed May 20, 2015 and claims the benefit of Great Britain Patent Application No. 1409163.1, filed May 22, 2014, the contents of which are herein incorporated in their entirety by reference. The International Application was published as International Publication No. WO 2015/177544 on Nov. 26, 2015.

FIELD OF THE INVENTION

The present invention relates to novel electrodes comprising particular doped nickelate-containing compositions; to the use of one or more of these electrodes in energy storage devices such as batteries, especially rechargeable batteries, electrochemical devices and electrochromic devices; and to energy storage devices which contain one or more electrodes comprising the particular doped nickelate-containing compositions. The present invention further relates to certain novel doped nickelate-containing compositions.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

Metal oxides with the general formula $A_xMO_2$ (where A represents one or more alkali metal ions and M represents one or more metal ions at least one of which has several oxidation states, for example a transition metal) are known to crystallise in a number of different layered structures. This is described in detail by C. Delmas et al in "Structural Classification and Properties of the Layered Oxides", Physica 99B (1980) 81-85. In summary, the structures are all made up of $MO_6$ edge sharing octahedra which form $(MO_2)_n$ sheets. These sheets are stacked one on top of the other and are separated by the alkali metal atoms and the exact position of the alkali metal will dictate whether the overall structure of the metal oxide is to be described as octahedral (O), tetrahedral (T) or prismatic (P). In a lattice made up of hexagonal sheets, there are three possible positions for the oxygen atoms, conventionally named A, B and C. It is the order in which these sheets are packed together that leads to the O, T and P environments. The number 2 or 3 is also used to describe the number of alkali metal layers in the repeat unit perpendicular to the layering. For example, when the layers are packed in the order ABCABC, an O3 structure is obtained. This translates to 3 alkali metal layers in the repeat unit and each alkali metal being in an octahedral environment Such materials are characterised by the alkali metal ions being in octahedral orientation and typical compounds of this structure are $A_xMO_2$ ($x \le 1$). The order ABAB with the alkali metal ions in tetrahedral orientation will yield a T1 structure which is typified by $A_2MO_2$ compounds. Packing the sheets in ABBA order gives a P2 structure in which one half of the prism shares edges with $MO_6$ octahedra and the other half shares faces and typical compounds are $A_{=0.7}MO_2$. And finally, packing in ABBCCA order results in a P3 structure type in which all prisms share one face with one $MO_6$ octahedron and three edges with three $MO_6$ octahedra of the next sheet $A_{=0.5}MO_2$ compounds are found to adopt the P3 structure. It will be noted that the amount of alkali metal present in the $A_xMO_2$ material has a direct bearing on the overall structure of the metal oxide.

Further, Y. J. Shin et al. report in Solid State Ionics 132 (2000) 131-141, the preparation and structural properties of layer-type oxides $Na_xNi_{x/2}Ti_{1-x/2}O_2$, in which x is in the range $0.6 \le x \le 1.0$. In particular, these workers disclose that rhombohedral (type O) is observed when $0.72 < x \le 1.0$ and hexagonal lattice (type P) is observed when $0.6 \le x \le 0.72$, and that both structure types O and P are present as a mixture when the product is made in a solid state process at around 1223 K (approximately 950° C.).

Over the last ten years, numerous workers have investigated the electrochemical properties of single phase metal oxides with either P2 or O3 structures. For example C. Delmas et al report the phase transformations and electrochemical behaviour of $P2-Na_xCoO_2$, see for example J. Solid State Chem., 2004, 177, 2790-2802 and Inorg. Chem., 2009, 48, 9671-9683. Further, Delmas et al have reported that although layered O3 type materials $Na_xVO_2$, $Na_xCrO_2$, $Na_xMnO_2$ and $Na_xFeO_2$ are able to host Na-ions upon charge and discharge and have excellent specific capacity performance, they nevertheless suffer significant capacity fading. Lu and Dahn, J. Electrochem. Soc., 2001, 148, A710-715, demonstrate that the P2-layered oxide $Na_{2/3}[Ni_{1/3}Mn_{2/3}]O_2$ can reversibly exchange Na-ions in sodium half cells however, these oxide compounds are expected to show poor cycling ability, especially between 2.3-4.5 V at C/100.

More recently, Kim et al Adv. Energy Mater., 2011, 1, 333-336 report that the presence of lithium in single phase P2 lithium substituted compounds such as $Na_{1.0}Li_{0.2}Ni_{0.25}Mn_{0.75}O_2$, provides some improvement in the structural stability during cycling, but the reversible capacity of these compounds is still too low due to the limited amount (25%) of redox active divalent Ni. An attempt to increase the capacity to be closer to the theoretical value of 180mAhg$^{-1}$ is reported by Kim et al in an abstract of their presentation to be given at The 17th International Meeting on Lithium Batteries Jun. 10-14, 2014 Como, Italy, and involves using $Na_{1-x}Li_xNi_{0.5}Mn_{0.5}O_2$ (Na/Li=1.0). During the course of this work, Kim et al note the presence of an intergrowth of P2 and O3 layered phases in this material which they hypothesize, stabilises the crystal structure and leads to improved reversible capacity. The best capacity results are reported for the x=0.3 compound, which also corresponds as being the compound with the highest percentage of P2. The x=0 material which is O3 stacked, is the lowest performer. In another recent paper by Y. Shirley Meng and D. H. Lee, Phys. Chem. Chem. Phys., 2013, 15, 3304, P2-$Na_{2/3}[Ni_{1/3}Mn_{2/3}]O_2$ is reported to exhibit excellent cycling and a high rate capability, however these results are only achieved when the material is charged below 4.22V; above 4.22V, the charge capacity in not maintained during cycling due to the phase transformation from P2 to O2.

In conclusion, the metal oxides studied discussed above are hampered either by low specific charge capacity or poor cycling stability especially across a wide range of charge voltages, and as a consequence the commercial application of these compounds in Na ion cells is limited.

The current workers have developed novel electrodes comprising particular doped-nickelate-containing compositions that are capable of delivering excellent specific capacity performance, in conjunction with little or no fading on cycling. Moreover, the doped-nickelate-containing compositions used in the electrodes of the present invention have been found to achieve these excellent results under voltage conditions that would typically result in their phase transformation from P2 to O2; this is a significant improvement over compounds used in the electrodes described in the prior art. Thus the present invention may be used to provide electrodes which are able to be recharged multiple times without significant loss in charge capacity. Advantageously, these electrodes may be used in batteries, especially rechargeable batteries, electrochemical devices and electrochromic devices.

The present invention therefore provides an electrode comprising doped nickelate-containing compositions comprising a first component type comprising one or more components with an O3 structure of the general formula:

$$A_a M^1{}_v M^2{}_w M^3{}_x M^4{}_y M^5{}_z O_2$$

wherein
A comprises one or more alkali metals selected from sodium, lithium and potassium;
$M^1$ is nickel in oxidation state 2+,
$M^2$ comprises one or more metals in oxidation state 4+,
$M^3$ comprises one or more metals in oxidation state 2+,
$M^4$ comprises one or more metals in oxidation state 4+, and
$M^5$ comprises one or more metals in oxidation state 3+
wherein
$0.85 \leq a \leq 1$, preferably $0.90 \leq a \leq 1$ and further preferably $0.95 \leq a \leq 1$;
$0 < v < 0.5$, preferably $0 < v \leq 0.45$ and ideally $0 < v \leq 0.333$;
at least one of w and y is >0;
$x \geq 0$, preferably $x > 0$;
$z \geq 0$;
and wherein a, v, w, x, y and z are chosen to maintain electroneutrality;
together with one or more component types selected from
a second component-type comprising one or more components with a P2 structure of the general formula:

$$A'_a M^{1'}{}_{v'} M^{2'}{}_{w'} M^{3'}{}_{x'} M^{4'}{}_{y'} M^{5'}{}_{z'} O_2$$

wherein
A' comprises one or more alkali metals selected from sodium, lithium and potassium;
$M^{1'}$ is nickel in oxidation state 2+,
$M^{2'}$ comprises one or more metals in oxidation state 4+,
$M^{3'}$ comprises one or more metals in oxidation state 2+,
$M^{4'}$ comprises one or more metals in oxidation state 4+, and
$M^{5'}$ comprises one or more metals in oxidation state 3+
wherein
$0.4 \leq a' < 1$, preferably $0.5 \leq a' < 0.85$, further preferably $0.6 \leq a' \leq 0.7$;
$0 < v' < 0.5$, preferably $0 < v' < 0.45$ and ideally $0 < v' \leq 0.333$;
at least one of w' and y' is >0;
$x' \geq 0$, preferably $x' > 0$;
$z' \geq 0$;
and wherein a', v', w', x', y' and z' are chosen to maintain electroneutrality;
and a third component-type comprising one or more components with a P3 structure of the general formula:

$$A''_a M^{1''}{}_{v''} M^{2''}{}_{w''} M^{3''}{}_{x''} M^{4''}{}_{y''} M^{5''}{}_{z''} O_2$$

wherein
A" comprises one or more alkali metals selected from sodium, lithium and potassium;
$M^{1''}$ is nickel in oxidation state 2+,
$M^{2''}$ comprises one or more metals in oxidation state 4+,
$M^{3''}$ comprises one or more metals in oxidation state 2+,
$M^{4''}$ comprises one or more metals in oxidation state 4+, and
$M^{5''}$ comprises one or more metals in oxidation state 3+
wherein
$0.4 \leq a'' < 1$, preferably $0.5 \leq a'' < 0.85$, further preferably $0.6 \leq a'' \leq 0.7$;
$0 < v'' < 0.5$, preferably $0 < v'' \leq 0.45$ and ideally $0 < v'' \leq 0.333$;
at least one of w" and y" is >0;
$x'' \geq 0$, preferably $x'' > 0$;
$z'' \geq 0$;
and wherein a", v", w", x", y" and z" are chosen to maintain electroneutrality.

Preferably the alkali metal A and/or A' and/or A" is selected from either sodium or a mixed alkali metal in which sodium is the major constituent.

Preferred electrodes comprise doped nickelate-containing compositions comprising:
a first component-type comprising one or more components with an O3 structure and of the general formula:

$$A_a M^1{}_v M^2{}_w M^3{}_x M^4{}_y M^5{}_z O_2$$

wherein
A comprises one or more alkali metals selected from sodium, lithium and potassium;
$M^1$ is nickel in oxidation state 2+,
$M^2$ comprises one or more metals in oxidation state 4+,
$M^3$ comprises one or more metals in oxidation state 2+,
$M^4$ comprises one or more metals in oxidation state 4+, and
$M^5$ comprises one or more metals in oxidation state 3+
wherein
$0.95 \leq a \leq 1$;
$0.3 \leq v \leq 0.333$;
at least one of w and y is >0;
$x > 0$;
$z \geq 0$;
and wherein a, v, w, x, y and z are chosen to maintain electroneutrality;
and
a second component-type comprising one or more components with a P2 structure of the general formula:

$$A'_a M^{1'}{}_{v'} M^{2'}{}_{w'} M^{3'}{}_{x'} M^{4'}{}_{y'} M^{5'}{}_{z'} O_2$$

wherein

A' comprises one or more alkali metals selected from sodium, lithium and potassium;

$M^{1'}$ is nickel in oxidation state 2+, $M^{2'}$ comprises one or more metals in oxidation state 4+, $M^{3'}$ comprises one or more metals in oxidation state 2+, $M^{4'}$ comprises one or more metals in oxidation state 4+, and $M^{5'}$ comprises one or more metals in oxidation state 3+ wherein $0.6 < a' < 0.85$;

$0.25 < v' \le 0.333$;

at least one of w' and y' is >0;

x'>0;

$z \ge 0$;

and wherein a', v', w', x', y' and z' are chosen to maintain electroneutrality.

Preferred first components with an O3 structure include:

$Na_{1-o}Ni_{(1-o)/3}Mn_{-o)/3}Mg_{(1/6)-(1/6)o}Ti_{(1/6)+(5/6)o}O_2$, where $0 \le o \le 0.15$;

preferably $0.001 \le a \le 0.05$, $Na_{0.95}Ni_{0.3167}Mn_{0.3167}Mg_{0.1583}Ti_{0.2083}O_2$ and $NaNi_{0.33}Mn_{0.33}Mg_{0.167}Ti_{0.167}O_2$.

Preferred second components with a P2 structure include:

$Na_{0.67}Ni_{0.33}Mn_{0.67}O_2$, $Na_{0.67}Ni_{0.3}Mn_{0.6}Mg_{0.033}Ti_{0.067}O_2$, $Na_{0.67}Ni_{0.267}Mn_{0.533}Mg_{0.067}Ti_{0.133}O_2$, $Na_{0.67}Ni_{0.25}Mg_{0.083}Mn_{0.667}O_2$, $Na_{0.67}Ni_{0.283}Mn_{0.057}Mg_{0.05}Ti_{0.1}O_2$, $Na_{0.67}Ni_{0.25}Mn_{0.667}Mg_{0.083}O_2$.

Preferred third components with a P3 structure include:

$Na_{0.667}Ni_{0.25}Mn_{0.65}Mg_{0.0835}Ti_{0.0165}O_2$, $Na_{0.6}Ni_{0.28}Mn_{0.6530}Mg_{0.02}Ti_{0.047}O_2$, $Na_{0.7}Ni_{0.32}Mn_{0.594}Mg_{0.03}Ti_{0.056}O_2$, $Na_{0.667}Ni_{0.25}Mn_{0.5}Mg_{0.0835}Ti_{0.1885}O_2$.

Metals $M^2$ and $M^4$ may be the same or different metal(s) in oxidation state 4+. Moreover $M^2$ and $M^4$ are interchangeable with each other. When $M^2 = M^4$, then the first component-type comprising one or more components with an O3 structure, may be written either as:

$$A_aM^1_VM^2_WM^3_XM^4_YM^5_ZO_2,$$

or $$A_aM^1_VM^2_{W+Y}M^3_XM^5_ZO_2,$$

or $$A_aM^1_VM^3_XM^4_{Y+W}M^5_ZO_2,$$

and all of these forms of the equation are to be regarded as equivalent.

The same is true for $M^{2'}$ and $M^{4'}$ in the second component-type comprising one or more components with a P2 structure, and also for $M^{2''}$ and $M^{4''}$ in the third component-type comprising one or more components with a P3 structure.

Preferably at least one of the components in one of the first, second and third component-types of the doped nickelate-containing compositions used in the electrodes of the present invention comprise sodium alone as the chosen alkali metal.

Also in further preferred electrodes of the present invention, each of $M^2$, $M^{2'}$ and $M^{2''}$ in the doped nickelate-containing compositions, comprise one or more metals in oxidation state 4+ selected from manganese, titanium and zirconium; each of $M^3$, $M^{3'}$ and $M^{3''}$ comprise one or more metals in oxidation state 2+ selected from magnesium, calcium, copper, zinc and cobalt; each of $M^4$, $M^{4'}$ and $M^{4''}$ comprise one or more metals in oxidation state 4+ selected from manganese, titanium and zirconium; and each of $M^5$, $M^{5'}$ and $M^{5''}$ comprise one or more metals in oxidation state 3+ selected from aluminium, iron, cobalt, molybdenum, chromium, vanadium, scandium and yttrium.

There is a continuum of possible ratios between the first component-type (O3): second component-type (P2): third component-type (P3) in doped nickelate-containing compositions used in the electrodes of the present invention and this will vary depending on the choice of first, second, and third component-types. In practice, the ratio which is chosen is the one found by experiment to provide the required excellent specific capacity and cycling performance. Examples of suitable ratios include:

1(O3):1(P2):0(P3),

1(O3):3(P2):0(P3),

3(O3):1(P2):0(P3),

1(O3):1(P2):1(P3).

The doped nickelate-containing compositions used in the electrodes of the present invention may be prepared by admixing a first component type comprising one or more components with an O3 structure of the general formula:

$$A_aM^1_VM^2_WM^3_XM^4_YM^5_ZO_2$$

wherein

A comprises one or more alkali metals selected from sodium, lithium and potassium;

$M^1$ is nickel in oxidation state 2+, $M^2$ comprises one or more metals in oxidation state 4+, $M^3$ comprises one or more metals in oxidation state 2+, $M^4$ comprises one or more metals in oxidation state 4+, and $M^5$ comprises one or more metals in oxidation state 3+, wherein $0.85 \le a \le 1$, preferably $0.90 \le a \le 1$ and further preferably $0.95 < a \le 1$;

$0 < v < 0.5$, further preferably $0 < v \le 0.45$ and ideally $0 < v \le 0.333$;

at least one of w and y is >0;

$x \ge 0$, preferably $x > 0$;

$z \ge 0$;

and wherein a, v, w, x, y and z are chosen to maintain electroneutrality;

together with one or more component types selected from:

a second component-type comprising one or more components with a P2 structure of the general formula:

$$A'_aM^{1'}_VM^{2'}_WM^{3'}_XM^{4'}_YM^{5'}_ZO_2$$

wherein

A' comprises one or more alkali metals selected from sodium, lithium and potassium;

$M^{1'}$ is nickel in oxidation state 2+, $M^{2'}$ comprises one or more metals in oxidation state 4+, $M^{3'}$ comprises one or more metals in oxidation state 2+, $M^{4'}$ comprises one or more metals in oxidation state 4+, and $M^{5'}$ comprises one or more metals in oxidation state 3+ wherein $0.4 \le a' < 1$, preferably $0.5 \le a' < 0.85$, further preferably $0.6 \le a' \le 0.7$;

$0 < v' < 0.5$, preferably $0 < v' \le 0.45$ and ideally $0 < v' \le 0.333$;

at least one of w' and y' is >0;

$x' \ge 0$, preferably $x' > 0$;

$z' \ge 0$;

and wherein a', v', w', x', y' and z' are chosen to maintain electroneutrality;

and a third component-type comprising one or more components with a P3 structure of the general formula:

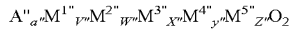

wherein
A" comprises one or more alkali metal selected from sodium, lithium and potassium;
$M^{1"}$ is nickel in oxidation state 2+,
$M^{2"}$ comprises one or more metals in oxidation state 4+,
$M^{3"}$ comprises one or more metals in oxidation state 2+,
$M^{4"}$ comprises one or more metals in oxidation state 4+, and
$M^{5"}$ comprises one or more metals in oxidation state 3+
wherein
$0.4 \leq a" < 1$, preferably $0.5 \leq a" < 0.85$, further preferably $0.6 \leq a" \leq 0.7$;
$0 < v" < 0.5$, preferably $0 < v" \leq 0.45$ and ideally $0 < v" \leq 0.333$;
s at least one of w" and y" is $>0$;
$x" \geq 0$, preferably $x" > 0$;
$z" \geq 0$;
and wherein a", v", w", x", y" and z" are chosen to maintain electroneutrality.

The above method produces doped nickelate-containing compositions which comprise a physical admixture of separate components (which in this case are separate compounds) which make up the first, second and third component-types. The separate compounds are prepared using any convenient method, for example a solid state method at 500-1200° C. Suitable methods are also described in PCT/GB2013/051821, PCT/GB2013/051822, PCT/2013/051808, PCT/GB2013/051824, and PCT/GB2013/052620.

The components of the first, second and third component-types may be admixed using any known method. Preferably, however, admixing is performed by solid state mixing, for example using a pestle and mortar, a micronizer or a mixer mill It is found useful to use a dispersant (such as a low boiling material, for example acetone) assist the mixing process, although this dispersant should be at least substantially removed prior to the synthesis, i.e. prior to the heating step. It is particularly advantageous to ensure that the components of the first component type and the components of one or both of the second and third component-types are intimately mixed together. It is also possible to mix the components of the first component-type with the components of one or both of the second and third component-types during the process for making electrode slurries.

In an alternative method, the doped nickelate-containing compositions used in the electrodes of the present invention are directly synthesized by reacting together precursor materials of the components of the first component-type, with the precursor materials of one or both of the second and third components of the second and third component-types, respectively, to yield a single compound in which components of the first, second and third component-types are present. Such a single compound, may comprise discrete regions within its structure of the first component-type comprising one or more components with an O3 structure as defined above, together with one or both of a second component-type comprising one or more components with a P2 structure as defined above and a third component-type comprising one or more components with a P3 structure as defined above. It is also possible that one or more of the first, second and third component-types are pre-made before being mixed with the precursor materials for the remaining first, second or third component-types, as required for the desired composition.

Thus, in a second aspect, the invention provides a process for making the doped nickelate-containing compositions comprising the chemical and/or physical mixing of a first component-type comprising either one or more components with an O3 structure of the general formula:

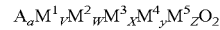

wherein
A comprises one or more alkali metals selected from sodium, lithium and potassium;
$M^1$ is nickel in oxidation state 2+,
$M^2$ comprises one or more metals in oxidation state 4+,
$M^3$ comprises one or more metals in oxidation state 2+,
$M^4$ comprises one or more metals in oxidation state 4+, and
$M^5$ comprises one or more metals in oxidation state 3+
Wherein
$0.85 \leq a \leq 1$, preferably $0.90 \leq a \leq 1$ and further preferably $0.95 < a \leq 1$;
$0 < v < 0.5$, further preferably $0 < v \leq 0.45$ and ideally $0 < v \leq 0.333$;
at least one of w and y is $>0$;
$x \geq 0$, preferably $x > 0$;
$z \geq 0'$
wherein a, v, w, x, y and z are chosen to maintain electroneutrality;
and/or the precursor materials for preparing the one more components with an O3 structure;
together with one or more component-types selected from:
a second component-type comprising either one or more components with a P2 structure of the general formula:

wherein
A' comprises one or more alkali metals selected from sodium, lithium and potassium;
$M^{1'}$ is nickel in oxidation state 2+,
$M^{2'}$ comprises one or more metals in oxidation state 4+,
$M^{3'}$ comprises one or more metals in oxidation state 2+,
$M^{4'}$ comprises one or more metals in oxidation state 4+, and
$M^{5'}$ comprises one or more metals in oxidation state 3+
wherein
$0.4 \leq a' < 1$, preferably $0.5 < a' < 0.85$, further preferably $0.6 \leq a' \leq 0.7$;
$0 < v' < 0.5$, preferably $0 < v' \leq 0.45$ and ideally $0 < v' \leq 0.333$;
at least one of w' and y' is $>0$;
$x' \geq 0$, preferably $x' > 0$;
$z' \geq 0$;
wherein a', v', w', x', y' and z' are chosen to maintain electroneutrality;
and/or the precursor materials for preparing the one more components with a P2 structure;
and a third component-type comprising either one or more components with a P3 structure of the general formula:

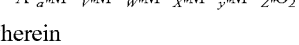

wherein
A" comprises one or more alkali metal selected from sodium, lithium and potassium;
$M^{1"}$ is nickel in oxidation state 2+.
$M^{2"}$ comprises one or more metals in oxidation state 4+,
$M^{3"}$ comprises one or more metals in oxidation state 2+, $M^{4''}$ comprises one or more metals in oxidation state 4+, and $M^{5''}$ comprises one or more metals in oxidation state 3+
wherein $0.4 \leq a'' < 1$, preferably $0.5 \leq a'' < 0.85$, further preferably $0.6 \leq a'' \leq 0.7$;

$0 < v'' < 0.5$, preferably $0 < v'' \leq 0.45$ and ideally $0 < v' \leq 0.333$;

at least one of $w''$ and $y''$ is $>0$;

$x'' \geq 0$, preferably $x'' > 0$;

$z'' \geq 0$;

wherein $a''$, $v''$, $w''$, $x''$, $y''$ and $z''$ are chosen to maintain electroneutrality;

and/or the precursor materials for preparing the one more components with a P3 structure.

The doped nickelate-containing compositions used in the electrodes of the present invention are conveniently described by a formula that uses a weighted average of the first component-type, together with one or more of the second and third component-types. For example a doped nickelate-containing composition with a first component-type comprising an O3 compound such as O3-$NaNi_{0.33}Mn_{0.33}Mg_{0.167}Ti_{0.167}O_2$, and a second component-type comprising a P2 compound such as P2-$Na_{0.67}Ni_{0.300}Mn_{0.600}Mg_{0.033}Ti_{0.067}O_2$ (where O3:P2 is in the ratio 1.1) can be described by the following weighted average formula: 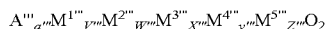 $Na_{0.833}Ni_{0.317}Mn_{0.467}Mg_{0.100}Ti_{0.117}O_2$.

It is worth noting that when the doped nickelate-containing compositions are made by chemical mixing, it is likely that the exact structure of each of the components of the first, second and third component-types will, in practice, be determined by whichever is the most thermodynamically stable structure for the O3, P2 and P3 phases, and this will be based on the ratio of the precursor materials used. Thus, in the above example, the O3 and P2 phases may be represented by $Na_{1-\epsilon}Ni_{0.33\pm\epsilon}Mn_{0.33\pm\epsilon}Mg_{0.167\pm\epsilon}Ti_{0.167\pm\epsilon}O_2$ and $Na_{0.67\pm\epsilon}Ni_{0.300\pm\epsilon}Mn_{0.600\pm\epsilon}Mg_{0.033\pm\epsilon}Ti_{0.067\pm\epsilon}O_2$ respectively, where ε refers to an unknown quantity.

In a third aspect, the present invention provides electrodes comprising doped nickelate-containing compositions comprising a first component-type comprising one or more components with an O3 structure together with one or more component types selected from a second component-type comprising one or more components with a P2 structure, and a third component-type comprising one or more components with an P3 structure, and with a weighted average formula represented by the general formula:

$$A'''_{a'''}M^{1'''}_{v'''}M^{2'''}_{w'''}M^{3'''}_{x'''}M^{4'''}_{y'''}M^{5'''}_{z'''}O_2$$

wherein $A'''$ comprises one or more alkali metals selected from sodium, lithium and potassium;

$M^{1'''}$ is nickel in oxidation state 2+, $M^{2'''}$ comprises one or more metals in oxidation state 4+, $M^{3'''}$ comprises one or more metals in oxidation state 2+, $M^{4'''}$ comprises one or more metals in oxidation state 4+, and $M^{5'''}$ comprises one or more metals in oxidation state 3+
wherein $0.4 \leq a''' < 1$, preferably $0.5 \leq a''' \leq 0.95$, further preferably $0.6 \leq a''' \leq 0.9$ and ideally $0.7 \leq a''' \leq 0.9$;

$0 < v''' < 0.5$, further preferably $0 < v''' \leq 0.45$, ideally $0 < v''' \leq 0.333$ and alternatively $0.2 \leq v''' \leq 0.333$;

at least one of $w'''$ and $y'''$ is $>0$;

$x''' \geq 0$, preferably $x''' > 0$;

$z''' \geq 0$;

and wherein $a'''$, $v'''$, $w'''$, $x'''$, $y'''$ and $z'''$ are chosen to maintain electroneutrality.

$A'''$ is the same as defined above for A, A' and A''; $M^{1'''}$ is the same as defined above for $M^1$, $M^{1'}$ and $M^{1''}$; $M^{2'''}$ is the same as defined above for $M^2$, $M^{2'}$ and $M^{2''}$; $M^{3'''}$ is the same as defined above for $M^3$, $M^{3'}$ and $M^{3''}$; $M^{4'''}$ is the same as defined above for $M^4$, $M^{4'}$ and $M^{4''}$; and $M^{5'''}$ is the same as defined above for $M^5$, $M^{5'}$ and $M^{5''}$.

Preferred doped nickelate-containing compositions used in the electrodes of the present invention are described by the following weighted average formulae:

 O3/P2-$Na_{0.833}Ni_{0.317}Mn_{0.467}Mg_{0.100}Ti_{0.117}O_2$,

 O3/P2-$Na_{0.750}Ni_{0.296}Mn_{0.508}Mg_{0.079}Ti_{0.117}O_2$,

 O3/P2-$Na_{0.85}Ni_{0.4}Mn_{0.5}Mg_{0.025}Ti_{0.075}O_2$,

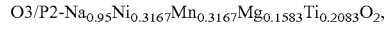 O3/P2-$Na_{0.95}Ni_{0.3167}Mn_{0.3167}Mg_{0.1583}Ti_{0.2083}O_2$,

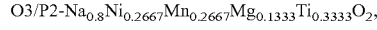 O3/P2-$Na_{0.8}Ni_{0.2667}Mn_{0.2667}Mg_{0.1333}Ti_{0.3333}O_2$,

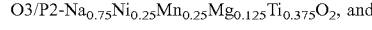 O3/P2-$Na_{0.75}Ni_{0.25}Mn_{0.25}Mg_{0.125}Ti_{0.375}O_2$, and

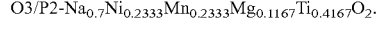 O3/P2-$Na_{0.7}Ni_{0.2333}Mn_{0.2333}Mg_{0.1167}Ti_{0.4167}O_2$.

The electrodes of the present invention are suitable for use in many different applications including sodium ion and/or lithium ion and/or potassium ion cells which may be widely used for example in energy storage devices, such as batteries, rechargeable batteries, electrochemical devices and electrochromic devices. Preferably the electrodes of the present invention may be used in conjunction with a counter electrode and one or more electrolyte materials. The electrolyte materials may be any conventional or known materials and may comprise either aqueous electrolyte(s) or non-aqueous electrolyte(s).

Advantageously, the electrodes of the present invention are cathode electrodes.

In a fourth aspect, the present invention provides for the use of electrodes that comprise doped nickelate-containing compositions as described above, in energy storage devices, such as batteries, rechargeable batteries, electrochemical devices and electrochromic devices.

In fifth aspect, the present invention provides energy storage devices such as batteries, rechargeable batteries, electrochemical devices and electrochromic devices that comprise an electrode comprising doped nickel-containing compositions as described above.

In a sixth aspect, the present invention provides doped nickelate-containing compositions comprising one or more component types selected from:

a first component-type comprising one or more components with an O3 structure of the general formula:

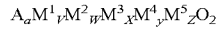 $A_aM^1_vM^2_wM^3_xM^4_yM^5_zO_2$ wherein

A comprises one or more alkali metal selected from sodium, lithium and potassium;

$M^1$ is nickel in oxidation state 2+, $M^2$ comprises one or more metals in oxidation state 4+, $M^3$ comprises one or more metals in oxidation state 2+, $M^4$ comprises one or more metals in oxidation state 4+, and $M^5$ comprises one or more metals in oxidation state 3+
wherein $0.85 \leq a \leq 1$, preferably $0.90 \leq a \leq 1$ and further preferably $0.95 \leq a \leq 1$;

$0<v<0.5$, preferably $0<v\leq0.333$;
at least one of w and y is $>0$;
$x\geq0$;
$z\geq0$;
and wherein a, v, w, x, y and z are chosen to maintain electroneutrality;
a second component-type comprising one or more components with a P2 structure of the general formula:

$$A'_a M^{1'}_v M^{2'}_w M^{3'}_x M^{4'}_y M^{5'}_z O_2$$

wherein
A' comprises one or more alkali metal selected from sodium, lithium and potassium;
$M^{1'}$ is nickel in oxidation state 2+,
$M^{2'}$ comprises one or more metals in oxidation state 4+,
$M^{3'}$ comprises one or more metals in oxidation state 2+,
$M^{4'}$ comprises one or more metals in oxidation state 4+, and
$M^{5'}$ comprises one or more metals in oxidation state 3+
wherein
$0.4\leq a'<1$, preferably $0.5\leq a'<0.85$; further preferably $0.6\leq a'\leq 0.7$;
$0<v'<0.5$, preferably $0<v'<0.45$ and ideally $0<v'\leq0.333$;
at least one of w' and y' is $>0$;
$x'\geq0$, preferably $x'>0$;
$z'\geq0$;
and wherein a', v', w', x', y' and z' are chosen to maintain electroneutrality;
and a third component-type comprising one or more components with a P3 structure of the general formula:

$$A''_a M^{1''}_v M^{2''}_w M^{3''}_x M^{4''}_y M^{5''}_z O_2$$

wherein
A'' comprises one or more alkali metals selected from sodium, lithium and potassium;
$M^{1''}$ is nickel in oxidation state 2+,
$M^{2''}$ comprises one or more metals in oxidation state 4+,
$M^{3''}$ comprises one or more metals in oxidation state 2+,
$M^{4''}$ comprises one or more metals in oxidation state 4+, and
$M^{5''}$ comprises one or more metals in oxidation state 3+
wherein
$0.4\leq a''<1$, preferably $0.5\leq a''<0.85$, further preferably $0.6\leq a''\leq0.7$;
$0<v''<0.5$, preferably $0<v''<0.45$ and ideally $0<v''\leq0.333$;
At least one of w'' and y'' is $>0$;
$x''\geq0$;
$z''\geq0$;
and wherein a'', v'', w'', x'', y'' and z'' are chosen to maintain electroneutrality.
In preferred doped nickelate-containing compositions of the present invention, at least one of x, x' and x'' is $>0$
The doped nickelate-containing composition according to the sixth aspect of the present invention can be represented by a weighted average formula:

$$A'''_a M^{1'''}_v M^{2'''}_w M^{3'''}_x M^{4'''}_y M^{5'''}_z O_2$$

wherein
A''' comprises one or more alkali metals selected from sodium, lithium and potassium;
$M^{1'''}$ is nickel in oxidation state 2+,
$M^{2'''}$ comprises one or more metals in oxidation state 4+,
$M^{3'''}$ comprises one or more metals in oxidation state 2+,
$M^{4'''}$ comprises one or more metals in oxidation state 4+, and
$M^{5'''}$ comprises one or more metals in oxidation state 3+ wherein
$0.4\leq a'''<1$, preferably $0.5<a'''\leq0.95$, further preferably $0.6\leq a'''\leq0.9$ and ideally $0.7\leq a'''\leq0.9$;
$0<v'''<0.5$, further preferably $0<v'''\leq0.45$, ideally $0<v'''\leq0.333$ and alternatively $0.2\leq v'''\leq0.333$;
at least one of w''' and y''' is $>0$;
$x'''\geq0$, preferably $x'''>0$;
$z'''\geq0$;
and wherein a''', v''', w''', x''', y''' and z''' are chosen to maintain electroneutrality.

All of A, A', A'', A''', $M^1$, $M^{1'}$, $M^{1''}$, $M^{1'''}$, $M^2$, $M^{2'}$, $M^{2''}$, $M^{2'''}$, $M^3$, $M^{3'}$, $M^{3''}$, $M^{3'''}$, $M^4$, $M^{4'}$, $M^{4''}$, $M^{4'''}$, $M^5$, $M^{5'}$, $M^{5''}$, and $M^{5'''}$ are as defined above in relation to the doped nickelate-containing compositions used in the electrode of the present invention. As will follow from the above description, the compositions of the sixth aspect of the present invention will be either i) a single compound comprising discrete areas containing one or more components with an O3 structure, together with discrete areas of components with one or both of P2 and P3 structures, or ii) it will be a physical mixture comprising one or more compounds with an O3 structure together with one or more compounds with a P2 and/or a P3 structure, or iii) it will be a mixture of i) and ii).

The doped nickelate-containing compositions according to the sixth aspect of the present invention may be used in energy storage devices such as batteries, rechargeable batteries, electrochemical devices and electrochromic devices. Use in an electrode in such energy storage devices is preferred.

The most preferred doped nickelate-containing compositions according to the sixth aspect of the present invention are selected from:

O3/P2-Na$_{0.833}$Ni$_{0.317}$Mn$_{0.437}$Mg$_{0.100}$Ti$_{0.117}$O$_2$,

O3/P2-Na$_{0.750}$Ni$_{0.296}$Mn$_{0.508}$Mg$_{0.079}$Ti$_{0.117}$O$_2$,

O3/P2-Na$_{0.85}$Ni$_{0.4}$Mn$_{0.5}$Mg$_{0.025}$Ti$_{0.075}$O$_2$,

O3/P2-Na$_{0.95}$Ni$_{0.3167}$Mn$_{0.3167}$Mg$_{0.1583}$Ti$_{0.2083}$O$_2$,

O3/P2-Na$_{0.8}$Ni$_{0.2667}$Mn$_{0.2667}$Mg$_{0.1333}$Ti$_{0.3333}$O$_2$,

O3/P2-Na$_{0.75}$Ni$_{0.25}$Mn$_{0.2}$Mg$_{0.125}$Ti$_{0.375}$O$_2$,

O3/P2-Na$_{0.7}$Ni$_{0.2333}$Mn$_{0.2333}$Mg$_{0.1167}$Ti$_{0.4167}$O$_2$.

The doped nickelate-containing compositions according to the sixth aspect, may be prepared according to the procedures described above.

When making doped nicklate-containing compositions it is possible to convert sodium-ion derivatives into mixed lithium-ion/sodium-ion materials using an ion exchange process.

Typical ways to achieve Na to Li-ion exchange include:
1. Mixing the sodium-ion material with a lithium-containing material e.g. LiNOs, heating to above the melting point of LiNO$_3$ (264° C.), cooling and then washing to remove the excess LiNO$_3$ and side-reaction product
2. Treating the Na-ion material with an aqueous solution of lithium salts, for example 1M LiCl in water; and
3. Treating the Na-ion material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following figures in which:

FIG. 10(A) is the XRD profile for the doped nickelate-containing composition of the present invention with the weighted average formula: O3/P2-$Na_{0.753}Ni_{0.296}Mn_{0.509}Mg_{0.079}Ti_{0.117}O_2$, as used in Example 10;

Figure 11A:
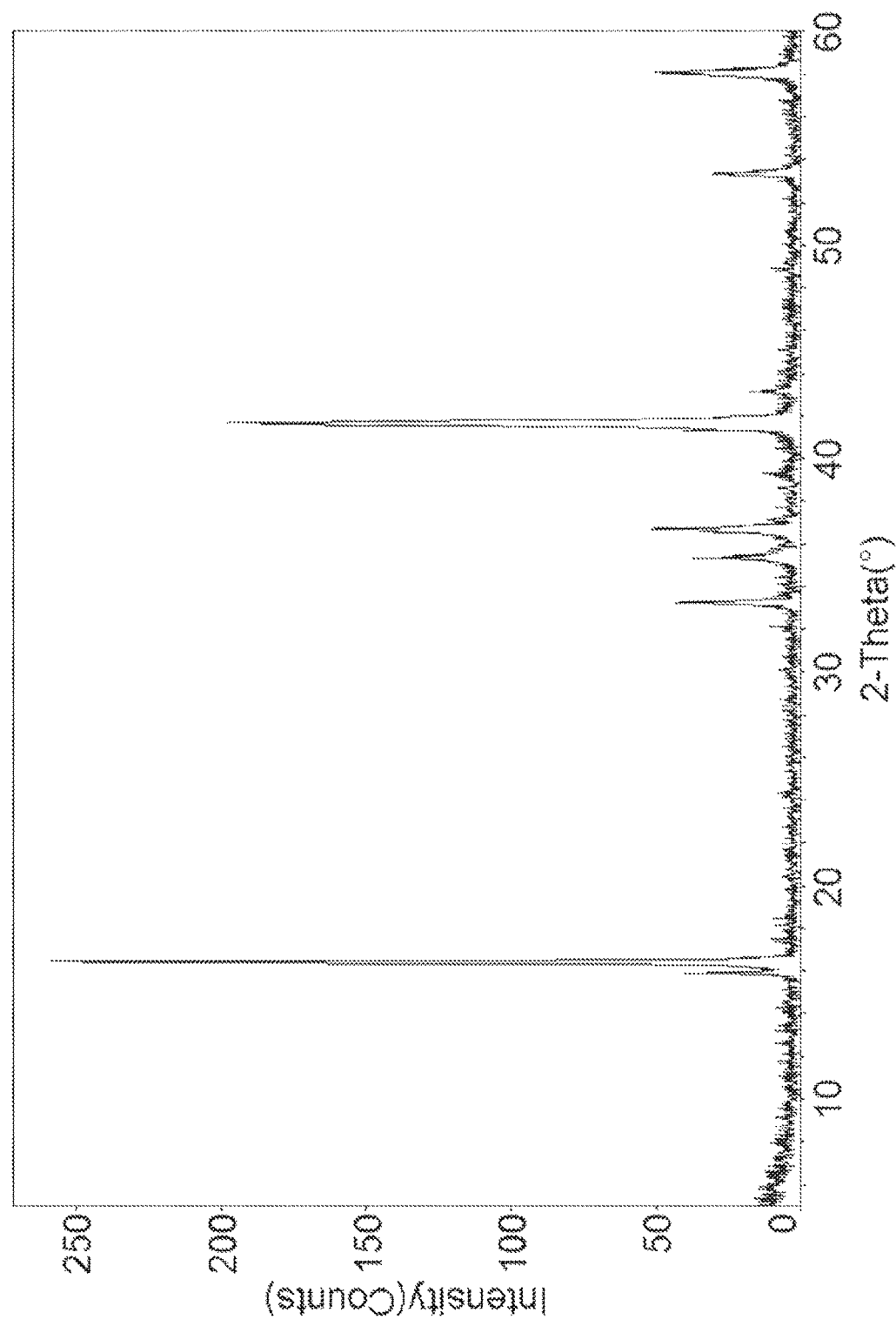
Figure 11B:
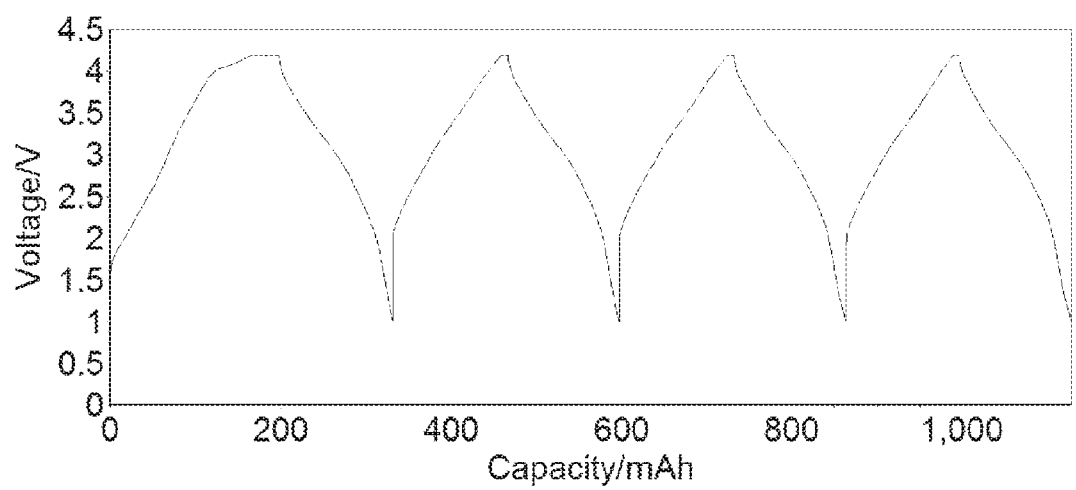
Figure 11C:
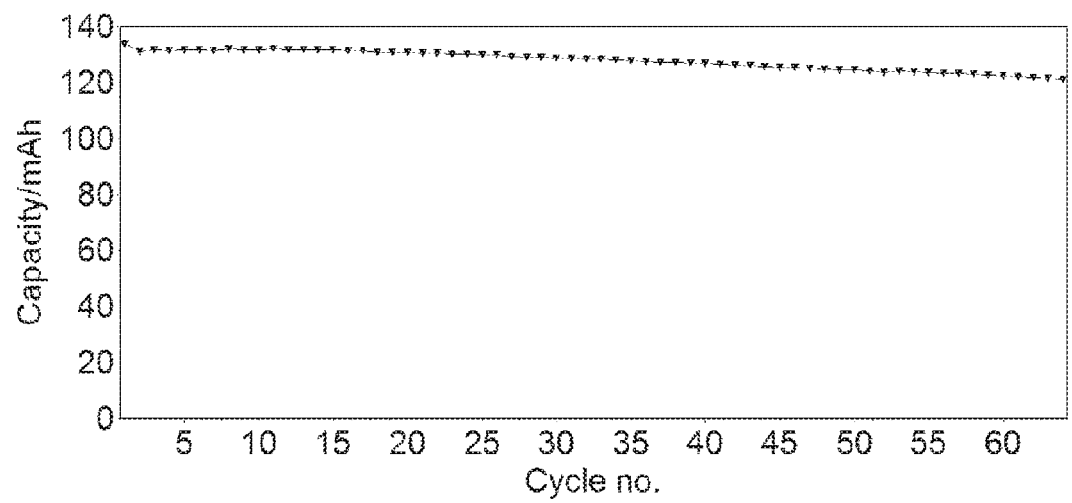
Figure 12A:
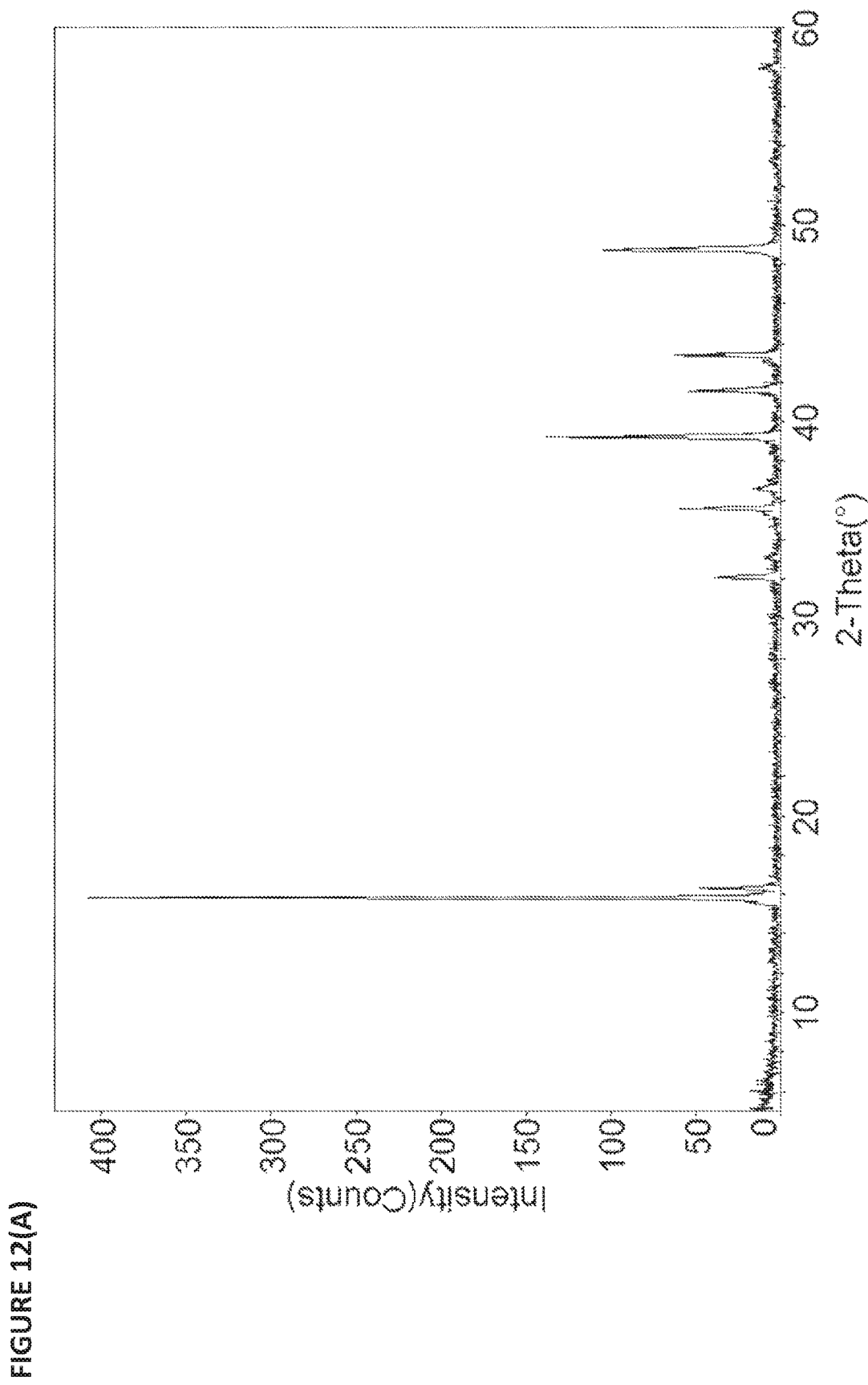
Figure 12B:
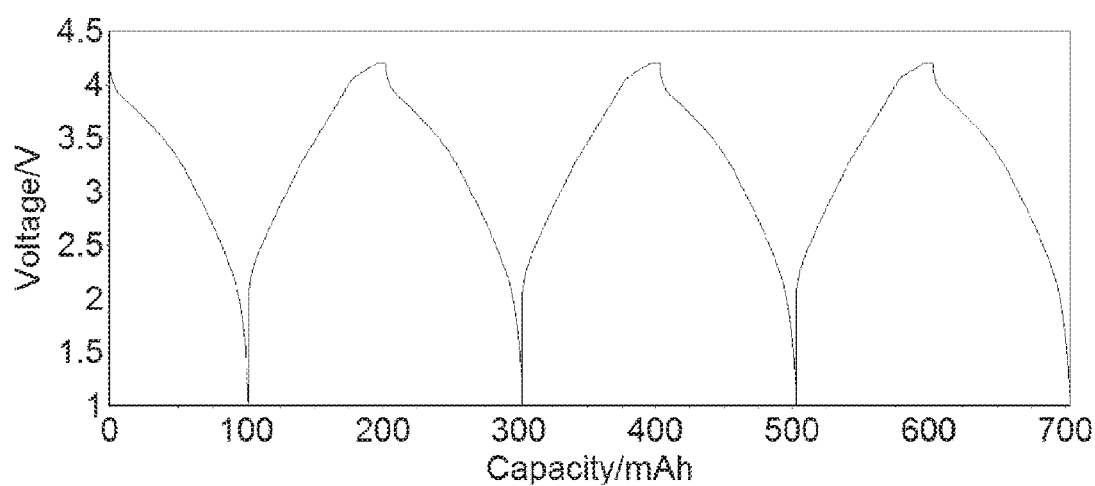
Figure 12C:
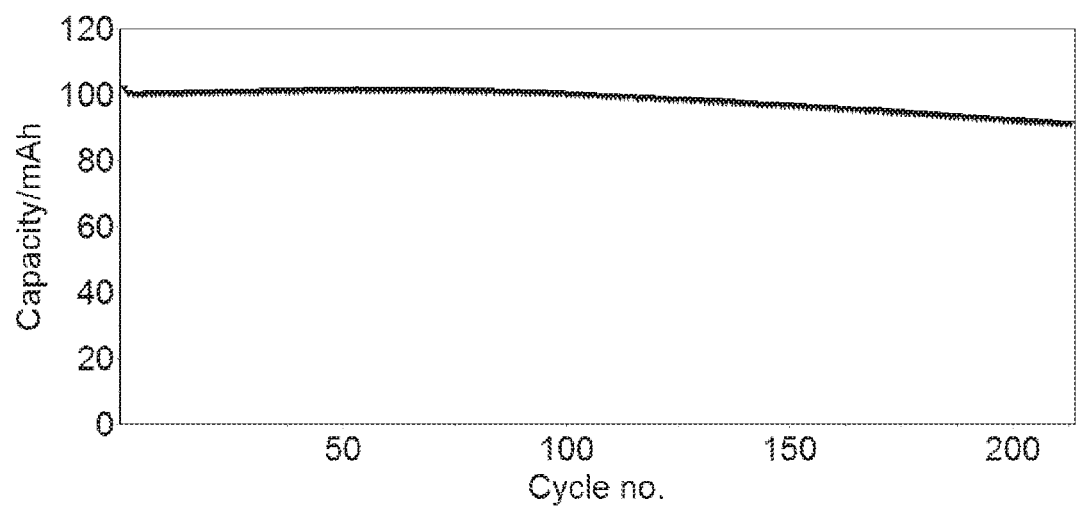
Figure 13:
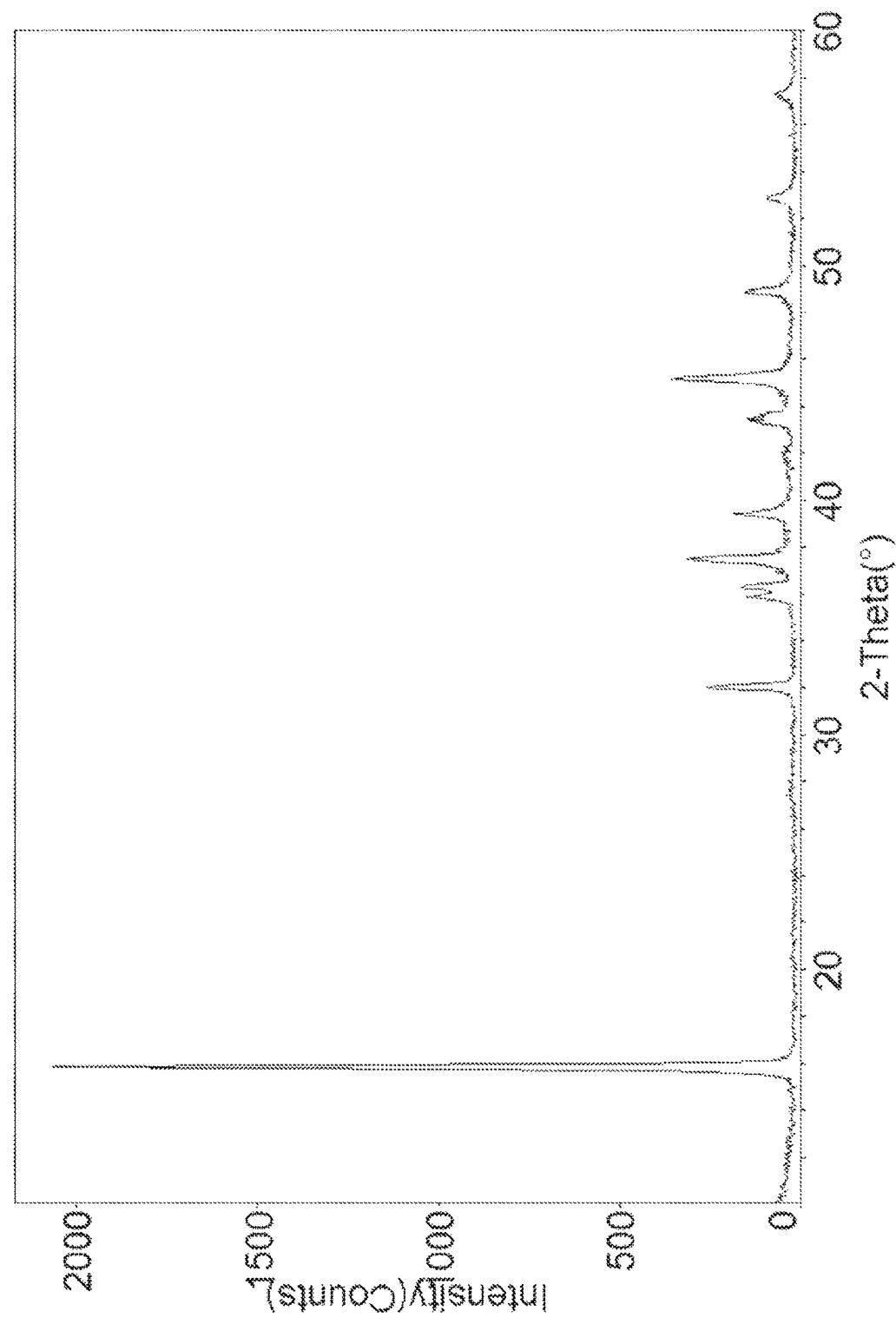
Figure 14:
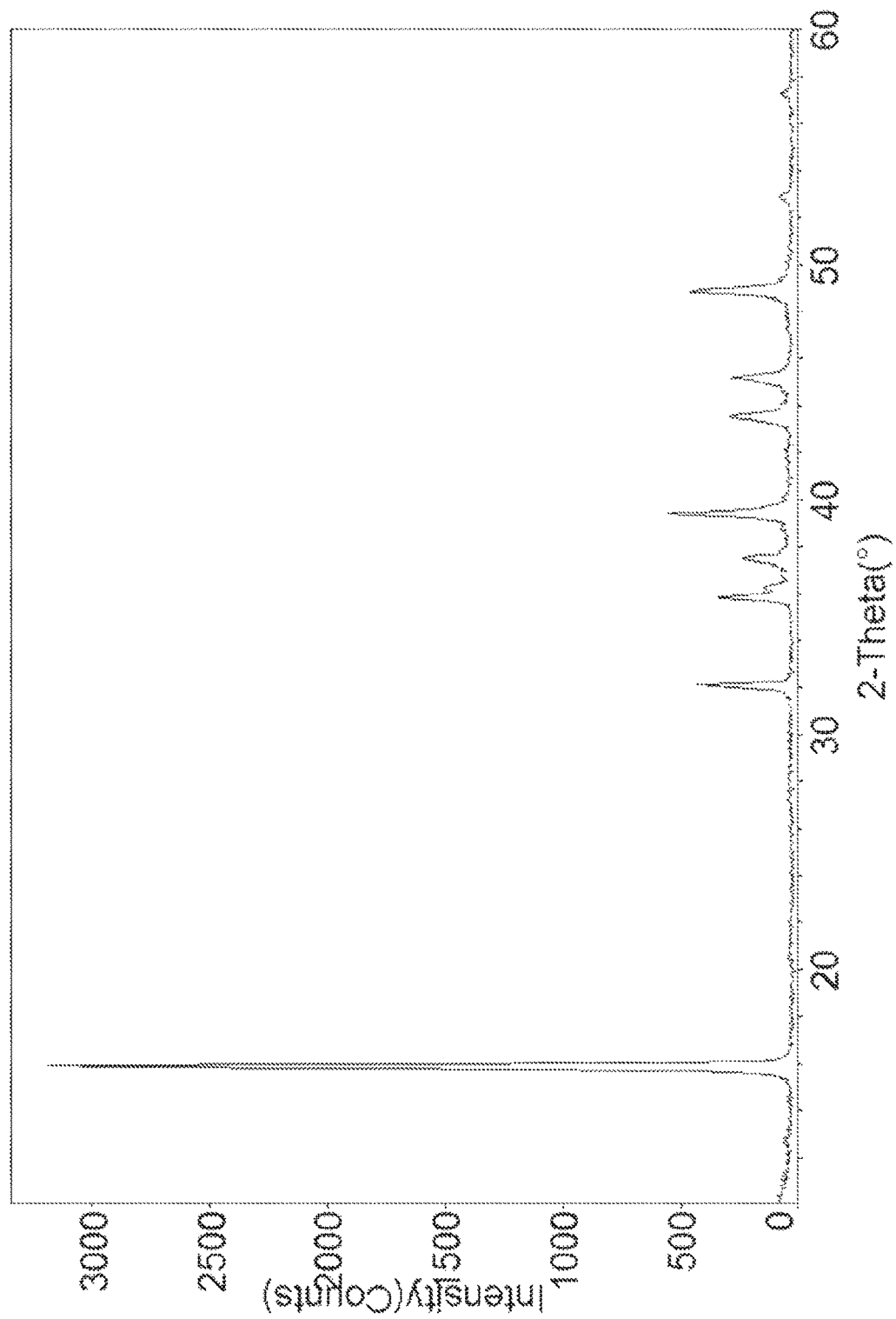
Figure 15:
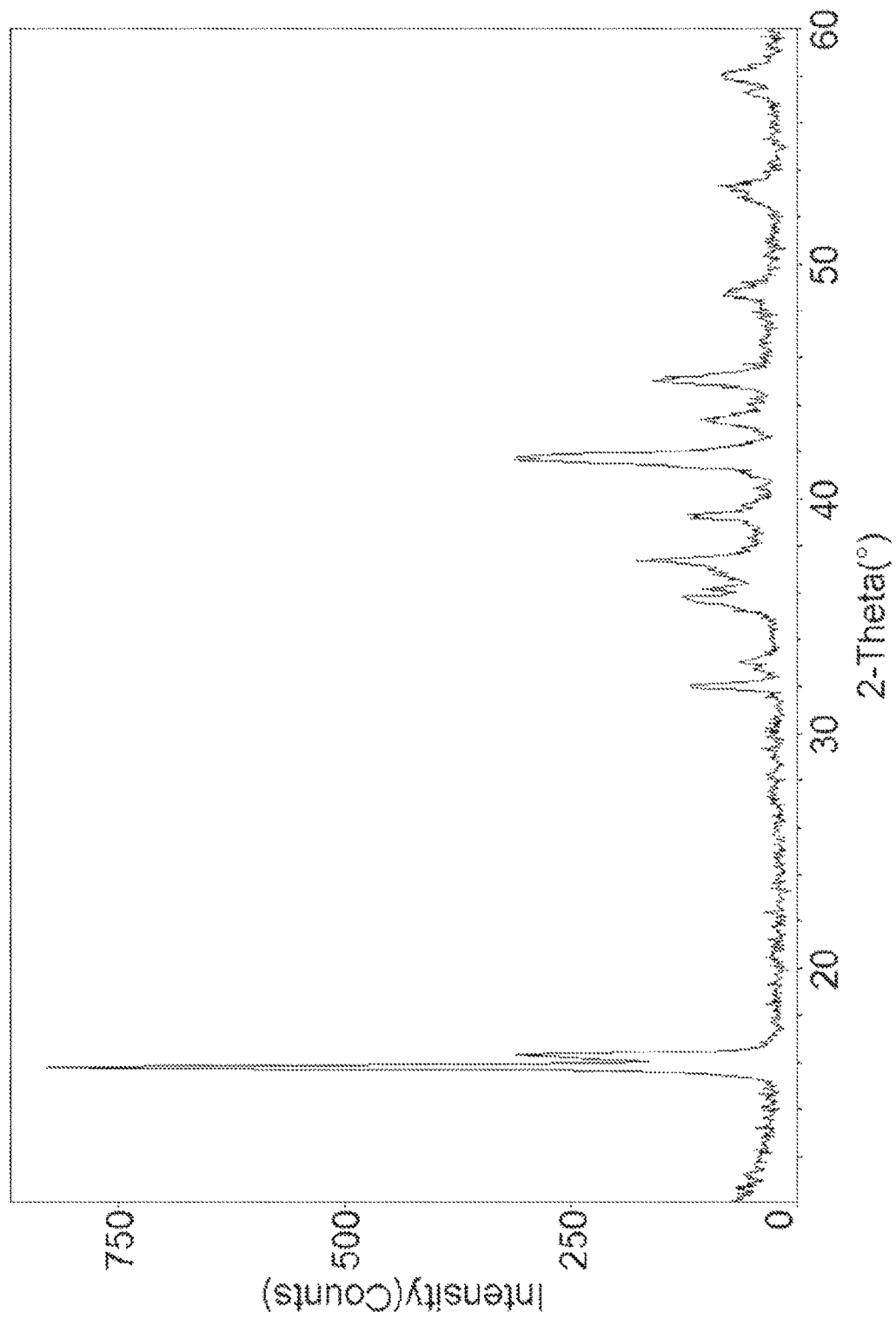
Figure 16:
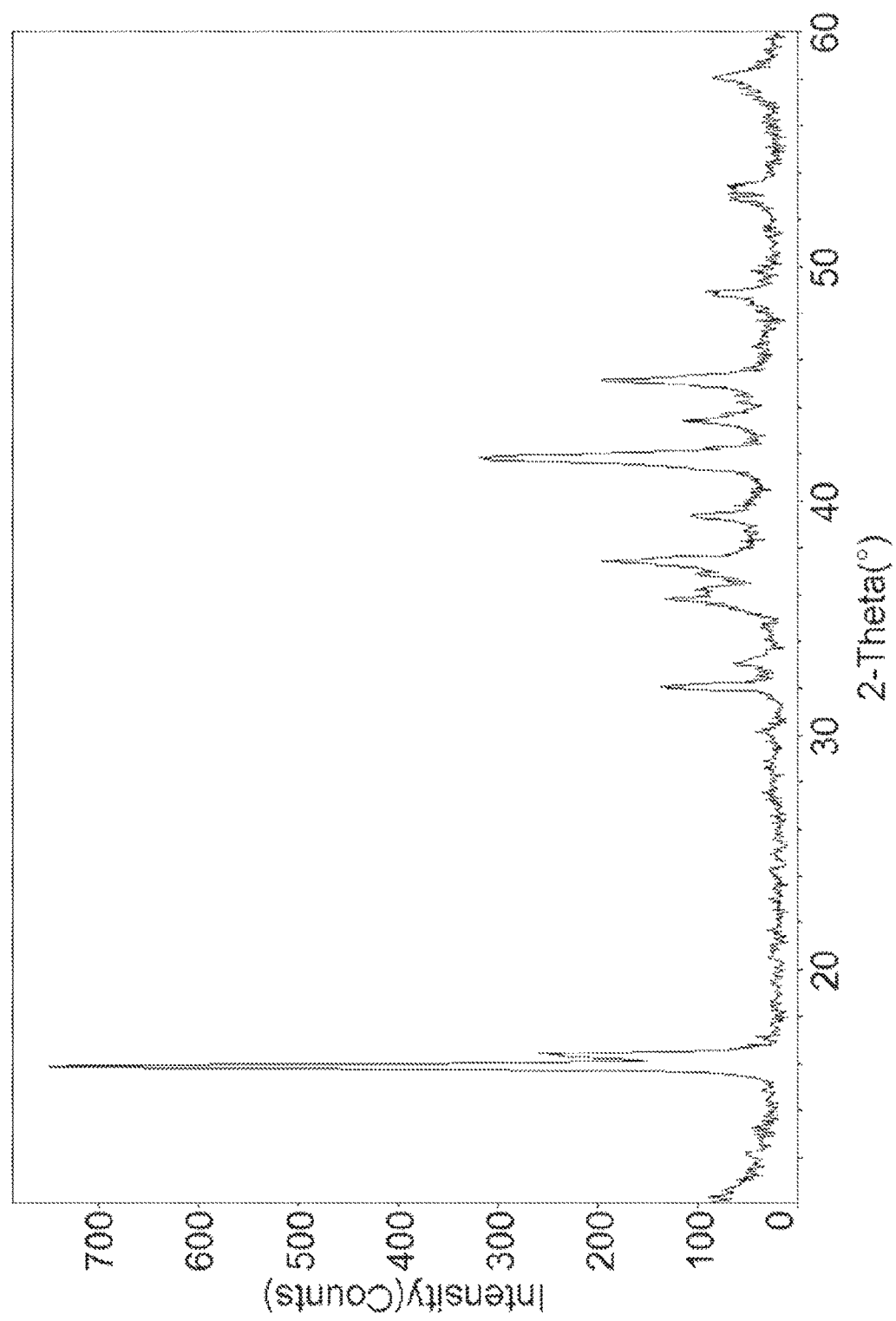

O3/P2-$Na_{0.75}Ni_{0.296}Mn_{0.508}Mg_{0.079}Ti_{0.117}O_2$ in the voltage range 1.0-4.2V at 30° C. in 0.5M $NaClO_4$, propylene carbonate (PC) and GF/A;

FIG. 11(A) is the XRD profile for the doped nickelate-containing composition of the present invention with the weighted average formula: O3/P2-$Na_{0.9}Ni_{0.3167}Mn_{0.3167}Mg_{0.1583}Ti_{0.2083}O_2$, as used in Example 11;

FIG. 11(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.95}Ni_{0.3167}Mn_{0.3167}Mg_{0.1583}Ti_{0.2083}O_2$ cell;

FIG. 11(C) shows the Constant current cycling (CC/CV) of full Na-ion Cell comprising hard carbon (Carbotron P(J) Kureha) and a doped nickelate-containing composition of the present invention with the weighted average formula: O3/P2-$Na_{0.95}Ni_{0.3167}Mn_{0.3167}Mg_{0.1583}Ti_{0.2083}O_2$ in the voltage range 1.0-4.2V at 30° C. in 0.5M $NaClO_4$, propylene carbonate (PC) and GF/A;

FIG. 12(A) is the XRD profile for the doped nickelate-containing composition of the present invention with the weighted average formula: O3/P2-$Na_{0.75}Ni_{0.296}Mn_{0.508}Mg_{0.079}Ti_{0.117}O_2$, as used in Example 12;

FIG. 12(B) shows the cell voltage profile (i.e. Na-ion Cell Voltage [V] versus Cumulative Cathode Specific Capacity [mAh/g]) for 4 charge/discharge cycles of the Hard Carbon/mixed phase O3/P2-$Na_{0.75}Ni_{0.296}Mn_{0.079}Ti_{0.117}O_2$ cell;

FIG. 12(C) shows the Constant current cycling (CC/CV) of full Na-ion Cell comprising hard carbon (Carbotron P(J) Kureha) and a doped nickelate-containing composition of the present invention with the weighted average formula: O3/P2-$Na_{0.75}Ni_{0.296}Mn_{0.508}Mg_{0.079}Ti_{0.117}O_2$ in the voltage range 1.0-4.2V at 30° C. in 0.5M $NaClO_4$, propylene carbonate (PC) and GF/A;

FIG. 13 shows the X-ray diffraction pattern of the weighted average formula P3/P2-$Na_{0.666}Ni_{0.3}Mn_{0.6}Mg_{0.033}Ti_{0.067}O_2$ (sample number S0842);

FIG. 14 shows the X-ray diffraction pattern of the weighted average formula P3/P2-$Na_{0.6667}Ni_{0.2500}Mn_{0.5833}Mg_{0.0833}Ti_{0.0833}O_2$ (sample number S1430A);

FIG. 15 shows the X-ray diffraction pattern of the weighted average formula O3/P2/P3-$Na_{0.8292}Ni_{0.2886}Mn_{0.4622}Mg_{0.126}Ti_{1233}O_2$ (sample number S1458B); and FIG. 16 shows the X-ray diffraction pattern of the weighted average formula O3/P2/P3-$Na_{0.8188}Ni_{0.2860}Mn_{0.4561}Mg_{0.1234}Ti_{0.1346}O_2$ (sample number S1459B).

DETAILED DESCRIPTION

Any convenient process may be used to make the doped nickelate-containing compositions of the present invention and as described above they may be prepared directly using a chemical reaction between one or more ready-made components of one or more first, second and third component-types. Alternatively, precursors for the one or more components of the first, second and third component types can be caused to react together. Further alternatively a combination of one or more ready-made components for the first, second and third component-types, together with one or more precursors therefor, may be used A convenient chemical reaction may use the following general method:

General Method:
1) Intimately mix together the starting materials (these can be the precursors for the one or more components of the one or more first, second and third component-types, or the ready-made components thereof, or any combination of the precursors and ready-made components) in the correct stoichiometric ratio and press into a pellet;
2) Heat the resulting mixture in a furnace under a suitable atmosphere comprising for example ambient air, nitrogen or an inert atmosphere (e.g. argon) (the gases may be flowing), at a furnace temperature for example of between 400° C. and 1500° C. until reaction product forms; and
3) Allow the product to cool, optionally grinding it to a powder.

Alternatively, the doped nickelate-containing compositions may be made with no chemical reaction between the first, second and third component-types, by physically admixing the components (i.e. the ready-made components) of the first, second and third component-types described above. Each of the separate components may be pre-made using the general method described above, and used directly as made from step 2) or step 3) by admixing to produce the doped nickelate-containing compositions used in the electrodes of the present invention.

Table 1 below lists the starting materials and heating conditions used to prepare the doped nickelate-containing compositions.

TABLE 1

| Example No. (Sample No.) | Doped nickelate-containing Composition | Starting Materials | Furnace Conditions |
|---|---|---|---|
| 1 (X1657) | P2—$Na_{0.67}Ni_{0.33}Mn_{0.67}O_2$ (Known material) | 0.333 $Na_2CO_3$<br>0.333 $NiCO_3$<br>0.667 $MnO_2$ | 900° C., air, 8 hours |
| 2 (X1659) | P2—$Na_{0.67}Ni_{0.3}Mn_{0.6}Mg_{0.033}Ti_{0.067}O_2$ (comparative example)<br>General formula: $Na_{(2/3)}Ni_{(1/3)-x}Mn_{(2/3)-y}Mg_xTi_yO_2$, where x = 1/30 and y = 1/15 | 0.333 $Na_2CO_3$<br>0.300 $NiCO_3$<br>0.600 $MnO_2$<br>0.033 $Mg(OH)_2$<br>0.067 $TiO_2$ | 900° C., air, 8 hours |
| 3 (X1663) | P2—$Na_{0.67}Ni_{0.267}Mn_{0.533}Mg_{0.067}Ti_{0.133}O_2$ (Comparative example)<br>General formula: $Na_{(2/3)}Ni_{(1/3)-x}Mn_{(2/3)-y}Mg_xTi_yO_2$, where x = 1/15 and y = 2/15 | 0.333 $Na_2CO_3$<br>0.267 $NiCO_3$<br>0.533 $MnO_2$<br>0.067 $Mg(OH)_2$<br>0.133 $TiO_2$ | 900° C., air, 8 hours |

TABLE 1-continued

| Example No. (Sample No.) | Doped nickelate-containing Composition | Starting Materials | Furnace Conditions |
|---|---|---|---|
| 4 (X1684) | P2—$Na_{0.67}Ni_{0.25}Mg_{0.083}Mn_{0.667}O_2$ (Comparative example) General formula: $Na_{(2/3)}Ni_{(1/3)-x}Mg_xMn_{(2/3)}O_2$, where x = $1/12$ | 0.333 $Na_2CO_3$ 0.250 $NiCO_3$ 0.083 $Mg(OH)_2$ 0.667 $MnO_2$ | 900° C., air, 10 hours |
| 5 (X1713) | P2—$Na_{0.67}Ni_{0.283}Mn_{0.567}Mg_{0.05}Ti_{0.1}O_2$ (Comparative example) General formula: $Na_{(2/3)}Ni_{(1/3)-x}Mn_{(2/3)-y}Mg_xTi_yO_2$, where x = $1/20$ and y = $1/10$ | 0.333 $Na_2CO_3$ 0.283 $NiCO_3$ 0.567 $MnO_2$ 0.050 $Mg(OH)_2$ 0.100 $TiO_2$ | 900° C., air, 10 hours |
| 6 (X1714) | O3—$Na_{0.95}Ni_{0.3167}Mn_{0.3167}Mg_{0.1583}Ti_{0.2083}O_2$ (Comparative example) General formula: $Na_{1-x}Ni_{(1-x)/3}Mn_{(1-x)/3}Mg_{(1/6)-(1/6)x}Ti_{(1/6)+(5/6)x}O_2$, where x = 0.05 | 0.475 $Na_2CO_3$ 0.3167 $NiCO_3$ 0.3167 $MnO_2$ 0.1583 $Mg(OH)_2$ 0.2083 $TiO_2$ | 900° C., air, 10 hours |
| 7 (X1713/ X1714) | Physical mixture: P2—$Na_{0.67}Ni_{0.283}Mn_{0.567}Mg_{0.05}Ti_{0.1}O_2$ and O3—$Na_{0.95}Ni_{0.3167}Mn_{0.3167}Mg_{0.1583}Ti_{0.2083}O_2$ P2:O3 75:25 | 75 wt. % X1713 25 wt. % X1714 | Hand-mixed using pestle & mortar |
| 8 (X1713/ X1714) | Physical mixture: P2—$Na_{0.67}Ni_{0.283}Mn_{0.567}Mg_{0.05}Ti_{0.1}O_2$ and O3—$Na_{0.95}Ni_{0.3167}Mn_{0.3167}Mg_{0.1583}Ti_{0.2083}O_2$ P2:O3 50:50 | 50 wt. % X1713 50 wt. % X1714 | Hand-mixed using pestle & mortar |
| 9 (X1682) | Weighted average formula: P2/O3—$Na_{0.833}Ni_{0.317}Mn_{0.467}Mg_{0.100}Ti_{0.117}O_2$ General formula: 1 − x $NaNi_{0.33}Mn_{0.33}Mg_{0.167}Ti_{0.167}O_2$: x $Na_{0.67}Ni_{0.33}Mn_{0.67}Mg_{0.033}Ti_{0.067}O_2$, where x = 0.5 | 0.4167 $Na_2CO_3$ 0.3167 $NiCO_3$ 0.467 $MnO_2$ 0.1 $Mg(OH)_2$ 0.1167 $TiO_2$ | 900° C., air, 10 hours |
| 10 (X1692) | Weighted average formula: P2/O3—$Na_{0.750}Ni_{0.296}Mn_{0.508}Mg_{0.079}Ti_{0.117}O_2$ General formula: 1 − x $NaNi_{0.33}Mn_{0.33}Mg_{0.167}Ti_{0.167}O_2$: x $Na_{0.67}Ni_{0.283}Mn_{0.567}Mg_{0.05}Ti_{0.1}O_2$, where x = 0.75 | 0.3675 $Na_2CO_3$ 0.295 $NiCO_3$ 0.509 $MnO_2$ 0.079 $Mg(OH)_2$ 0.117 $TiO_2$ | 900° C., air, 10 hours |
| 11 (X1696C) | Weighted Average formula: P2/O3—$Na_{0.95}Ni_{0.3167}Mn_{0.3167}Mg_{0.1583}Ti_{0.2083}O_2$ General formula: $Na_{1-\sigma}Ni_{(1-\sigma)/3}Mn_{(1-\sigma)/3}Mg_{(1/6)-(1/6)\sigma}Ti_{(1/6)+(5/6)\sigma}O_2$, where $\sigma$ = 0.05 Very small amount of P2 phase present due to short dwell time | 0.475 $Na_2CO_3$ 0.3167 $NiCO_3$ 0.3167 $MnO_2$ 0.1583 $Mg(OH)_2$ 0.2083 $TiO_2$ | 900° C., air, 4 minutes |
| 12 (X1700) | Weighted average formula: P2/O3—$Na_{0.75}Ni_{0.296}Mn_{0.508}Mg_{0.079}Ti_{0.117}O_2$ General formula: 1 − x $NaNi_{0.33}Mn_{0.33}Mg_{0.167}Ti_{0.167}O_2$: $xNa_{0.67}Ni_{0.283}Mn_{0.567}Mg_{0.05}Ti_{0.1}O_2$, where x = 0.75 | 0.3750 $Na_2CO_3$ 0.2958 $NiCO_3$ 0.5083 $MnO_2$ 0.0792 $Mg(OH)_2$ 0.1167 $TiO_2$ | 900° C., air, 10 hours |
| 13 (S0842) | Weighted average formula: P3/P2–$Na_{0.666}Ni_{0.3}Mn_{0.6}Mg_{0.033}Ti_{0.067}O_2$ General formula: $Na_{(2/3)}Ni_{((1/3)-\alpha)}Mn_{((2/3)-\beta)}Mg_\alpha Ti_\beta O_2$ | 0.333 $Na_2CO_3$ 0.06 ($2NiCO_3 \cdot 3Ni(OH)_2 \cdot 4H_2O$) 0.6 $MnO_2$ 0.033 $Mg(OH)_2$ 0.067 $TiO_2$ | 800° C., air, 6 hours |
| 14 (S1430A) | Weighted average formula: P3/P2—$Na_{0.6667}Ni_{0.2500}Mn_{0.5833}Mg_{0.0833}Ti_{0.0833}O_2$ General formula: $Na_{(1-\sigma)}Ni_{(-1/4\sigma+1/3)}Mn_{-(2/3-1/12)\sigma+7/9}Mg_{(-1/4\sigma+1/6)}Ti_{(13/12\sigma-5/18)}O_2$ Where $\sigma$ = 0.3333 | 0.3334 $Na_2CO_3$ 0.0500 $2NiCO_3 \cdot 3Ni(OH)_2 \cdot 4H_2O$ 0.5833 $MnO_2$ 0.0833 $Mg(OH)_2$ 0.0833 $TiO_2$ | 800° C., air, 6 hours |
| 15 (S1458B) | Weighted average formula: P3/P2/O3—$Na_{0.8292}Ni_{0.2886}Mn_{0.4622}Mg_{0.126}Ti_{0.1233}O_2$ General formula: 1 − x $Na_{0.95}Ni_{0.3167}Mn_{0.316}, Mg_{0.1583}Ti_{0.2083}O_2$: x $Na_{0.7083}Na_{0.2604}Mn_{0.6076}Mg_{0.0937}Ti_{0.0382}O_2$, where x = 0.5 | 0.4146 $Na_2CO_3$ 0.0577 $2NiCO_3 \cdot 3Ni(OH)_2 \cdot 4H_2O$ 0.4622 $MnO_2$ 0.1260 $Mg(OH)_2$ 0.1233 $TiO_2$ | 750° C., air, 6 hours |
| 16 (S1459B) | Weighted average formula: P3/P2/O3—$Na_{0.8188}Ni_{0.2860}Mn_{0.4561}Mg_{0.1234}Ti_{0.1346}O_2$ General formula: 1 − x $Na_{0.95}Ni_{0.3167}Mn_{0.3167}Mg_{0.1583}Ti_{0.2083}O_2$: x $Na_{0.6875}Ni_{0.2552}Mn_{0.5955}Mg_{0.0885}Ti_{0.0608}O_2$, where x = 0.5 | 0.4094 $Na_2CO_3$ 0.0572 $2NiCO_3 \cdot 3Ni(OH)_2 \cdot 4H_2O$ 0.4561 $MnO_2$ 0.1234 $Mg(OH)_2$ 0.1346 $TiO_2$ | 750° C., air, 6 hours |

Product Analysis Using XRD

Analysis by X-ray diffraction techniques was conducted using a Siemens D5000 powder diffractometer to confirm that the desired target doped nickelate-containing compositions had been prepared, to establish the phase purity of the product material and to determine the types of impurities present. From this information it is possible to determine the lattice parameters of the unit cells.

The general XRD operating conditions used to analyse the materials are as follows:
Slits sizes: 1 mm, 1 mm, 0.1 mm
Range: 2θ=5°-60°
X-ray Wavelength=1.5418 Å (Angstroms) (Cu Kα)
Speed: 1.0 seconds/step
Increment: 0.025°

Electrochemical Results

The target doped nickelate-containing compositions were tested using a Na-ion test cell using a hard carbon anode. Cells may be made using the following procedures:

A Na-ion electrochemical test cell containing the active material is constructed as follows:

Generic Procedure to Make a Hard Carbon Na-ion Cell

The positive electrode is prepared by solvent-casting a slurry of the active material, conductive carbon, binder and solvent. The conductive carbon used is Super P (Timcal). PVdF is used as the binder, and N-methyl-2-pyrrolidone (NMP) is employed as the solvent. The slurry is then cast onto aluminium foil and heated until most of the solvent evaporates and an electrode film is formed. The electrode is then dried under dynamic vacuum at about 120° C. The electrode film contains the following components, expressed in percent by weight: 80% active material (doped nickelate-containing composition), 6% Super P carbon, and 6% PVdF binder.

The negative electrode is prepared by solvent-casting a slurry of the hard carbon active material (Carbotron P/J, supplied by Kureha), conductive carbon, binder and solvent. The conductive carbon used is Super P (Timcal). PVdF is used as the binder, and N-Methyl-2-pyrrolidone (NMP) is employed as the solvent. The slurry is then cast onto aluminium foil and heated until most of the solvent evaporates and an electrode film is formed. The electrode is then dried further under dynamic vacuum at about 120° C. The electrode film contains the following components, expressed in percent by weight: 89% active material, 2% Super P carbon, and 9% PVdF binder.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, alkali ions are extracted from the cathode active material. During discharge, alkali ions are re-inserted into the cathode active material.

Discussion of the Results

EXAMPLE 1: P2-$Na_{0.67}Ni_{0.33}Mn_{0.67}O_2$

Figure 1A:
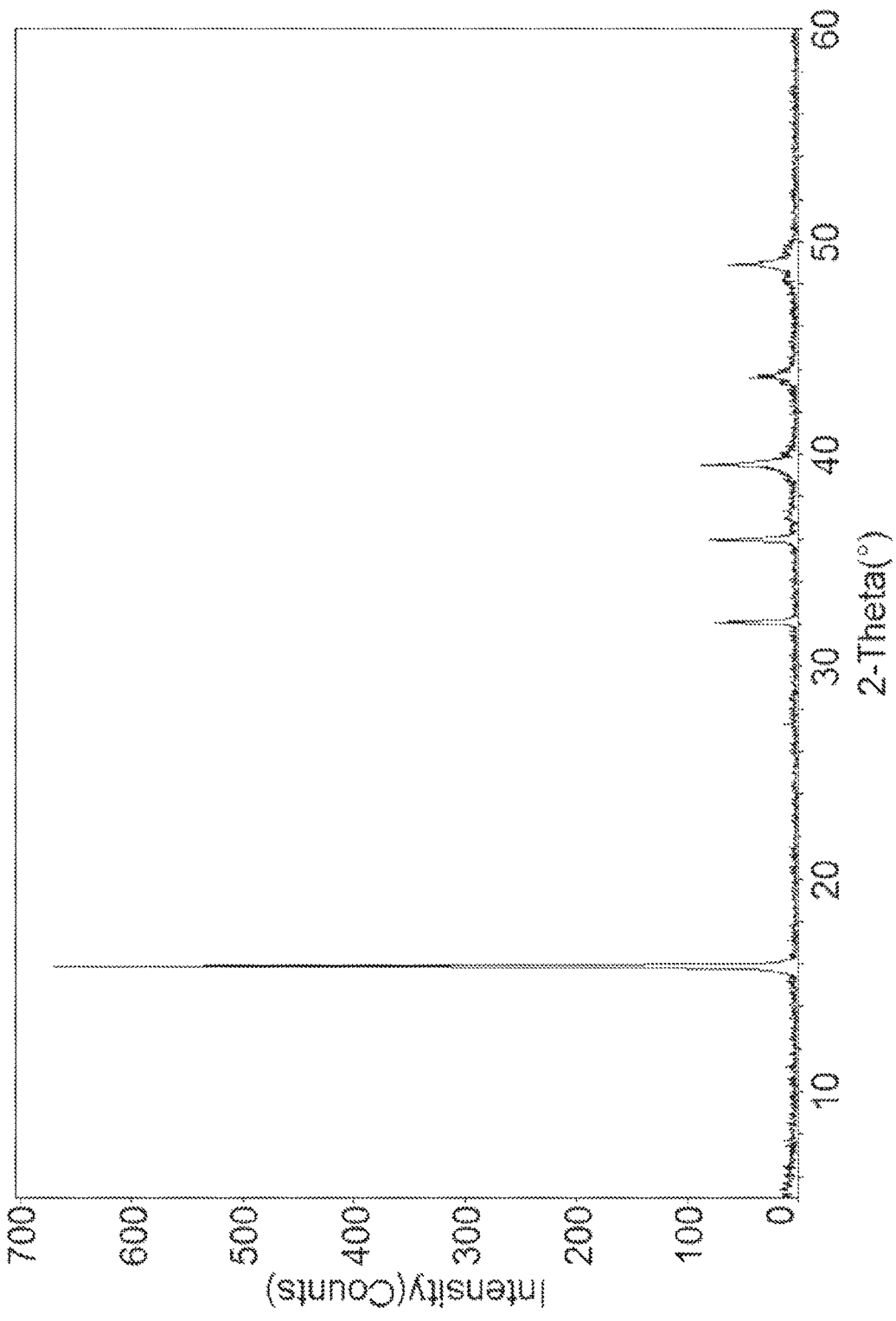
FIG. 1(A) is the XRD profile for the known compound P2-$Na_{0.67}Ni_{0.33}Mn_{0.67}O_2$ (comparative material) used in Example 1.

FIG. 1(A) shows the X-ray diffraction pattern of the known material $Na_{0.67}Ni_{0.33}Mn_{0.67}O_2$ (sample number X1657). The pattern shows that this material conforms to a layered P2-type structure.

Figure 1B:
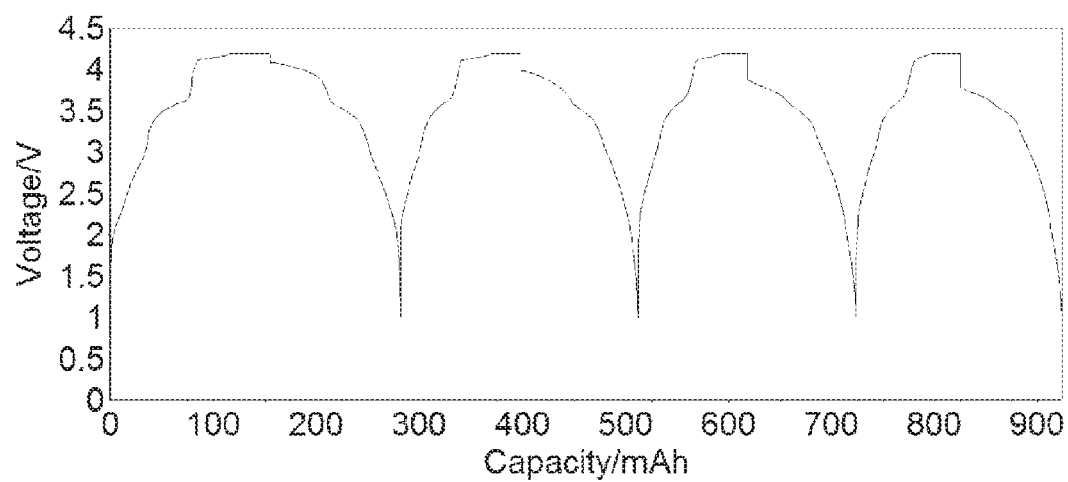
FIG. 1(B) shows the cell voltage profile (i.e. Na-ion Cell Voltage [V] versus Cumulative Cathode Specific Capacity [mAh/g]) for the first 4 charge/discharge cycles of the Hard Carbon/$Na_{0.67}Ni_{0.33}Mn_{0.67}O_2$ cell.
Figure 1C:
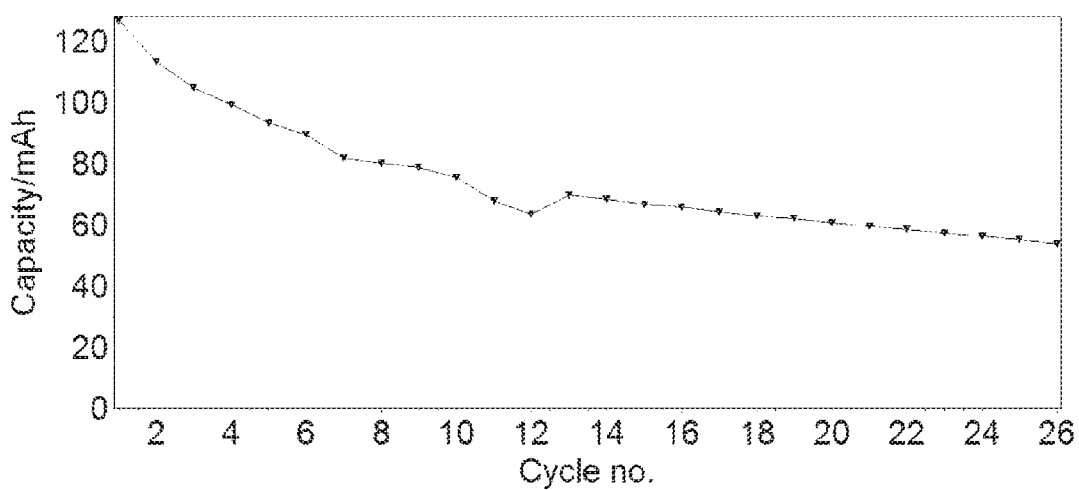
FIG. 1(C) shows the Constant current cycling (CC/CV) of full Na-ion Cell comprising hard carbon (Carbotron P(J) Kureha) and P2-$Na_{0.67}Ni_{0.33}Mn_{0.67}O_2$ in the voltage range 1.0-4.2V at 30° C. in 0.5M $NaClO_4$, with propylene carbonate (PC) and glass filter paper (GF/A) used as a separator.

Referring to FIGS. 1(B)-(C):

The data shown in FIGS. 1(B)-(C) are derived from the constant current cycling data for a $Na_{0.67}Ni_{0.33}Mn_{0.67}O_2$ cathode active material in a Na-ion cell (Cell#311044) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm² between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 1(B) shows the cell voltage profile (i.e. Na-ion Cell Voltage [V] versus Cumulative Cathode Specific Capacity [mAh/g]) for the first 4 charge/discharge cycles of the Hard Carbon/$Na_{0.67}Ni_{0.33}Mn_{0.67}O_2$ cell. These data demonstrate that the level of voltage hysteresis (i.e. the voltage difference between the charge and discharge processes) is large indicating the relatively poor kinetic reversibility of the Na-ion extraction-insertion reactions in this cathode material.

FIG. 1(C) shows the constant current cycle life profile (i.e. the relationship between Cathode Specific Capacity for Discharge [mAh/g] and cycle number for the Hard Carbon/$Na_{0.67}Ni_{0.33}Mn_{0.67}O_2$ cell. For cycle 1 the discharge specific capacity for the cathode is about 127 mAh/g. For cycle 20 the discharge specific capacity for the cathode is about 61 mAh/g. This represents a capacity fade of about 52% over 20 cycles or an average of 2.6% per cycle. The cathode material under test clearly demonstrates relatively poor capacity retention behaviour.

EXAMPLE 2: P2-$Na_{0.67}Ni_{0.3}Mn_{0.6}Mg_{0.033}Ti_{0.067}O_2$

Figure 2A:
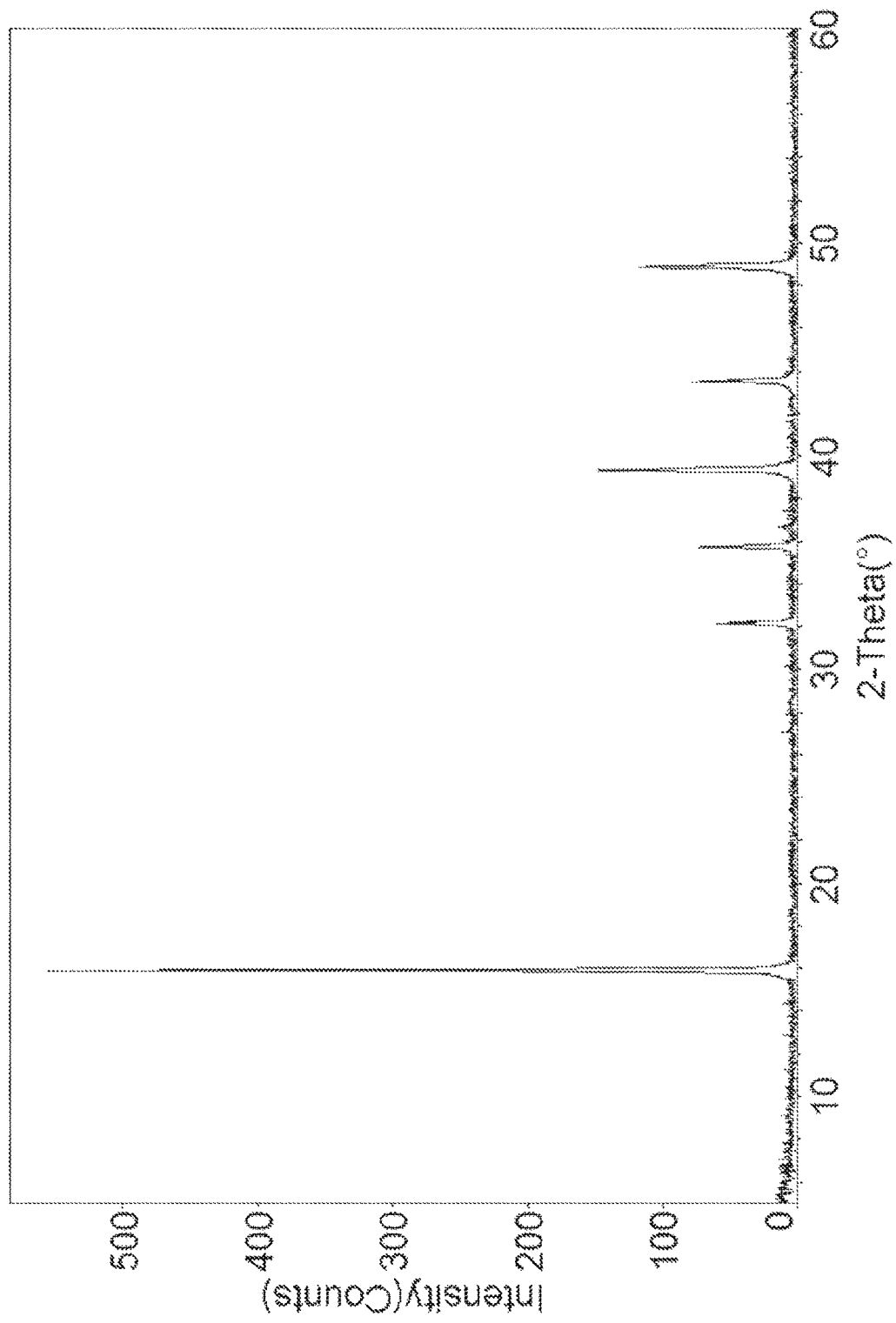
FIG. 2(A) is the XRD profile for the compound P2-$Na_{0.67}Ni_{0.3}Mn_{0.6}Mg_{0.033}Ti_{0.067}O_2$ (comparative material) used in Example 2.

FIG. 2(A) shows the X-ray diffraction pattern of $Na_{0.67}Ni_{0.3}Mn_{0.6}Mg_{0.033}Ti_{0.067}O_2$ (sample number X1659). The pattern shows that the sample conforms to a layered P2-type structure.

Figure 2B:
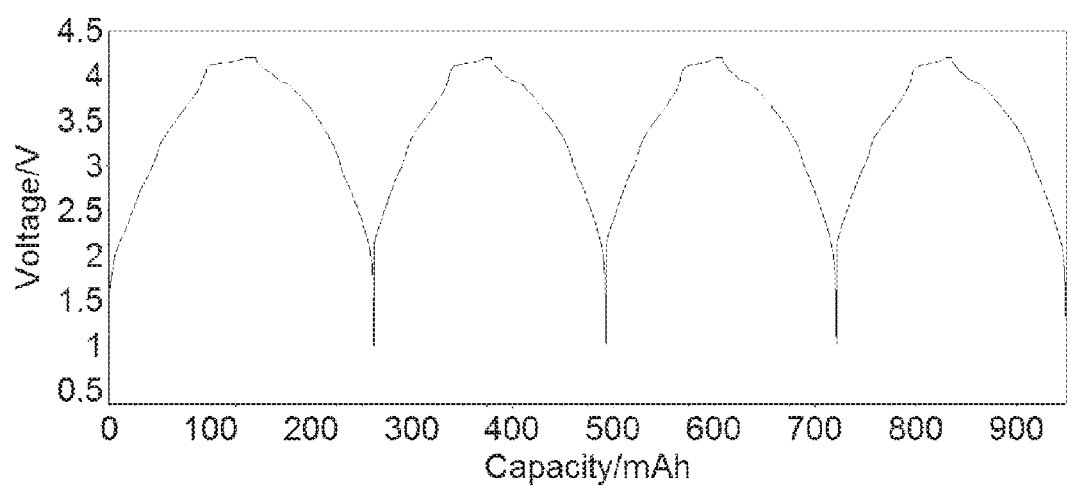
FIG. 2(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.30}Mn_{0.60}Mg_{0.033}Ti_{0.067}O_2$ cell.
Figure 2C:
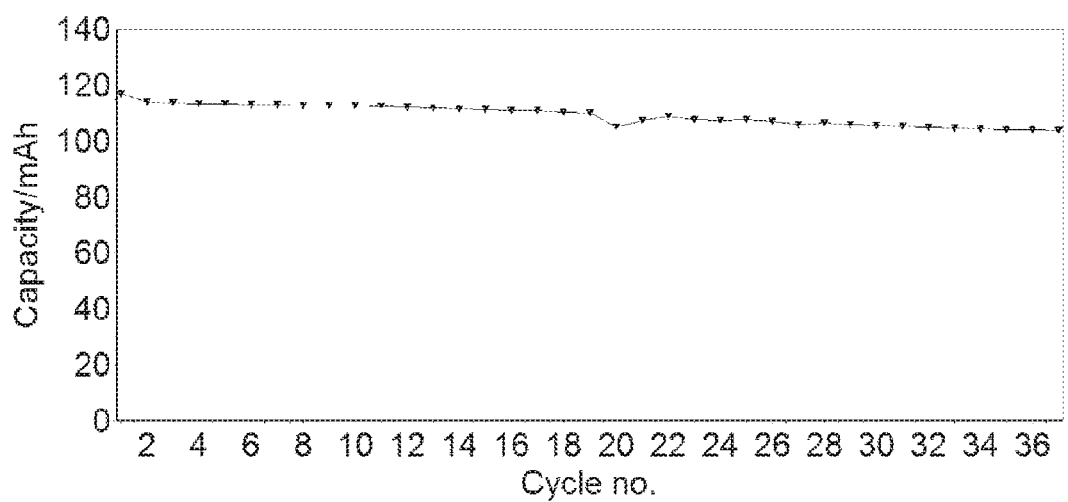
FIG. 2(C) shows the Constant current cycling (CC/CV) of full Na-ion Cell comprising hard carbon (Carbotron P(J) Kureha) and P2-$Na_{0.67}Ni_{0.3}Mn_{0.6}Mg_{0.033}Ti_{0.067}O_2$ in the voltage range 1.0-4.2V at 30° C. in 0.5M $NaClO_4$, propylene carbonate (PC) and GF/A.

Referring to FIGS. 2(B)-(C):

The data shown in FIGS. 2(B)-(C) are derived from the constant current cycling data for a P2-$Na_{0.67}Ni_{0.30}Mn_{0.60}Mg_{0.033}Ti_{0.067}O_2$ cathode active material in a Na-ion cell (Cell#311051) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm² between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 2(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.30}Mn_{0.60}Mg_{0.033}Ti_{0.067}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 2(C) shows the constant current cycle life profile (i.e. the relationship between Cathode Specific Capacity for Discharge [mAh/g] and cycle number for the Hard Carbon/P2-$Na_{0.67}Ni_{0.30}Mn_{0.60}Mg_{0.033}Ti_{0.067}O_2$ cell. For cycle 1 the discharge specific capacity for the cathode is about 117 mAh/g. For cycle 30 the discharge specific capacity for the cathode is about 106 mAh/g. This represent a capacity fade of about 9.4% over 30 cycles or an average of 0.3% per cycle. The cathode material under test clearly demonstrates excellent capacity retention behaviour.

EXAMPLE 3:
P2-$Na_{0.67}Ni_{0.67}Mn_{0.533}Mg_{0.067}Ti_{0.133}O_2$

Figure 3A:
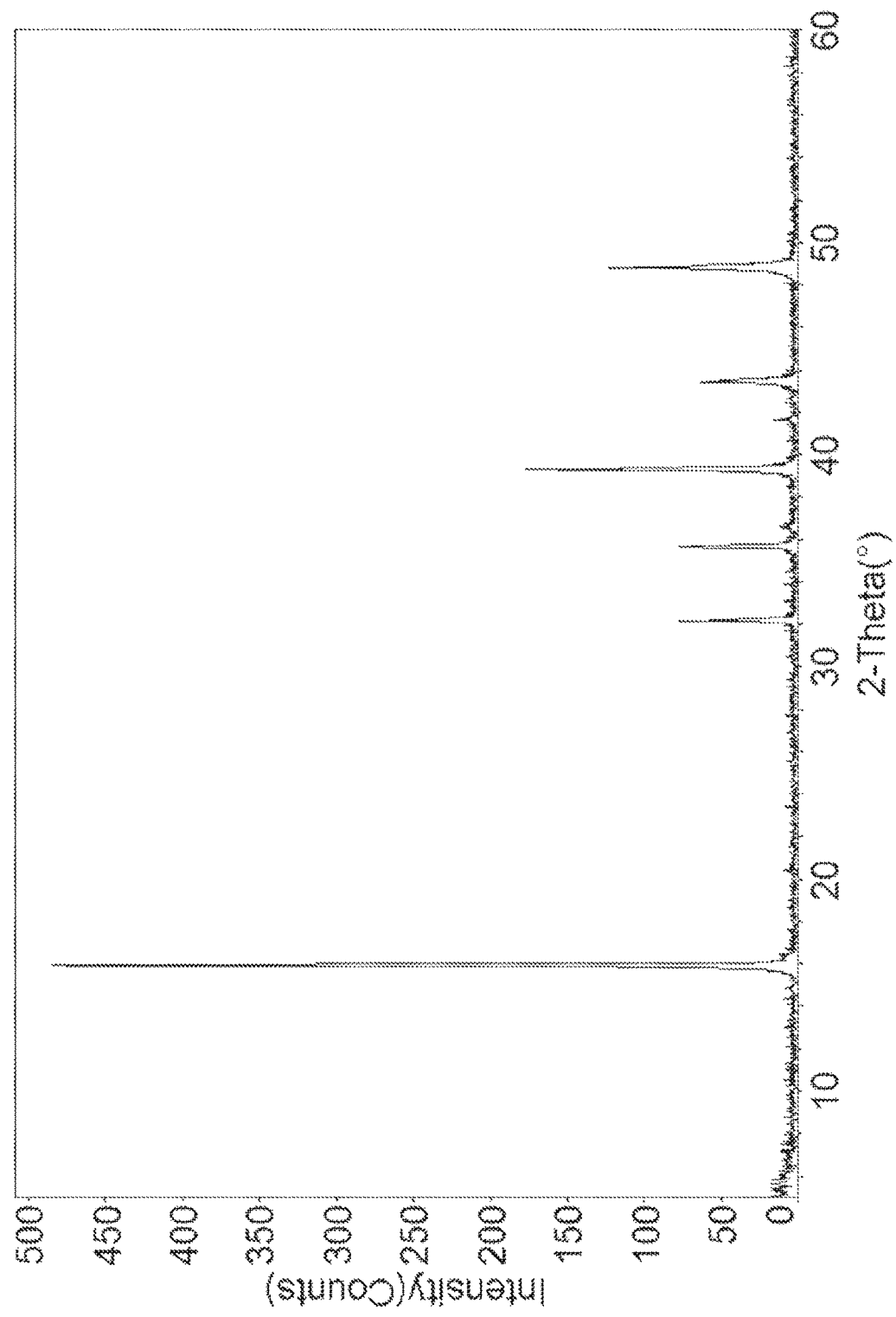
FIG. 3(A) is the XRD profile for the compound P2-$Na_{0.67}Ni_{0.267}Mn_{0.533}Mg_{0.067}Ti_{0.133}O_2$ (comparative material) used in Example 3.

FIG. 3(A) shows the X-ray diffraction pattern of $Na_{0.67}Ni_{0.267}Mn_{0.533}Mg_{0.067}Ti_{0.33}O_2$ (sample number X1663). The pattern shows that the sample conforms to a layered P2-type structure.

Figure 3B:
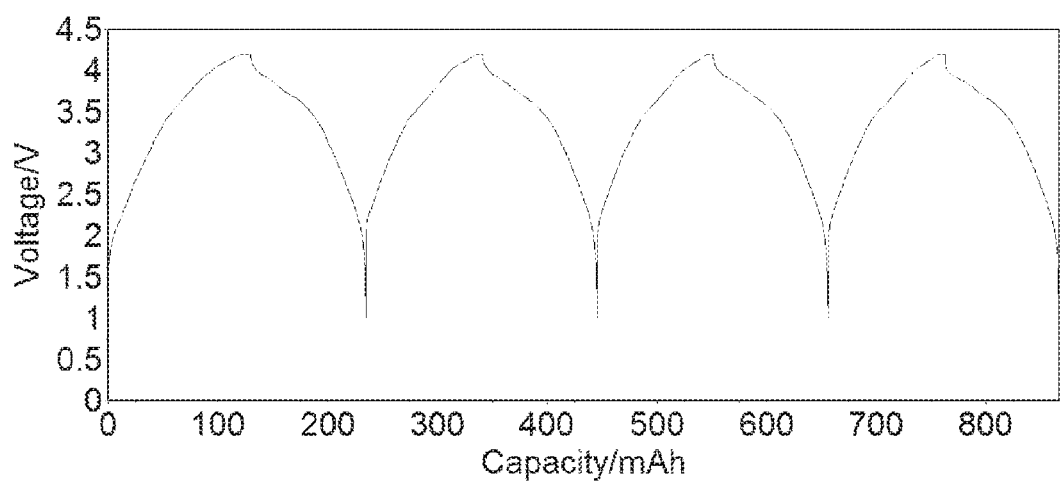
FIG. 3(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.267}Mn_{0.533}Mg_{0.067}Ti_{0.33}O_2$ cell.
Figure 3C:
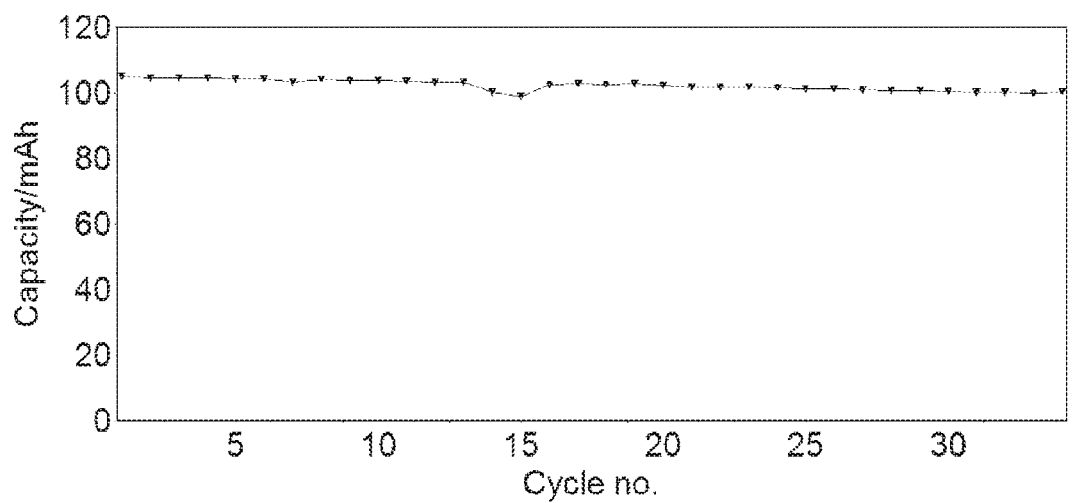
FIG. 3(C) shows the Constant current cycling (CC/CV) of full Na-ion Cell comprising hard carbon (Carbotron P(J) Kureha) and P2-$Na_{0.67}Ni_{0.267}Mn_{0.533}Mg_{0.067}Ti_{0.133}O_2$ in the voltage range 1.0-4.2V at 30CC in 0.5M $NaClO_4$, propylene carbonate (PC) and GF/A.

Referring to FIGS. 3(B)-(C):

The data shown in FIGS. 3(B)-(C) are derived from the constant current cycling data for a P2-$Na_{0.67}N_{0.267}Ti_{0.133}Mg_{0.067}Mn_{0.533}O_2$ cathode active material in a Na-ion cell (Cell#311058) where this cathode material was coupled with a Hard Carbon (Carbotron P(J)) anode material. The electrolyte used was a 0.5 M solution of $NaClO_4$ in propylene carbonate (PC). The constant current data were collected at an approximate current density of 0.2 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 3(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.267}Ti_{0.133}Mg_{0.067}Mn_{0.533}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 3(C) shows the constant current cycle life profile (i.e. the relationship between Cathode Specific Capacity for Discharge [mAh/g] and cycle number for the Hard Carbon/P2-$Na_{0.67}Ni_{0.267}Ti_{0.133}Mg_{0.067}Mn_{0.533}O_2$ cell. For cycle 1 the discharge specific capacity for the cathode is about 105 mAh/g. For cycle 30 the discharge specific capacity for the cathode is about 101 mAh/g. This represents a capacity fade of about 3.8% over 30 cycles or an average of 0.13% per cycle. The cathode material under test clearly demonstrates excellent capacity retention behaviour.

EXAMPLE 4: P2-$Na_{0.67}Ni_{0.25}Mg_{0.083}Mn_{0.667}O_2$

Figure 4A:
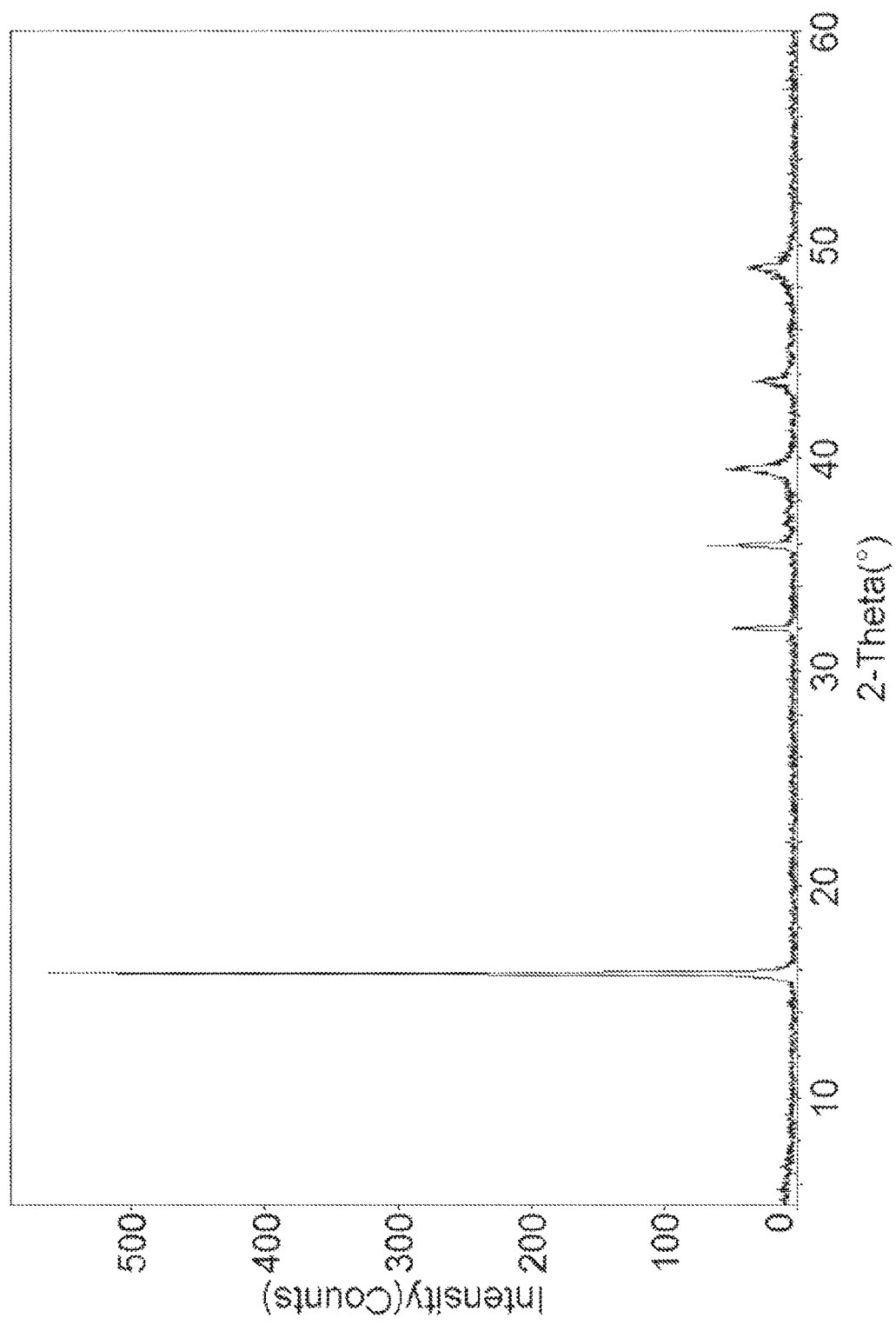
FIG. 4(A) is the XRD profile for the compound P2-$Na_{0.67}Ni_{0.25}Mn_{0.667}Mg_{0.083}O_2$ (comparative material) used in Example 4.

FIG. 4(A) shows the X-ray diffraction pattern of $Na_{0.67}Ni_{0.25}Mg_{0.083}Mn_{0.667}O_2$ (sample number X1684). The pattern shows that the sample conforms to a layered P2-type structure.

Figure 4B:
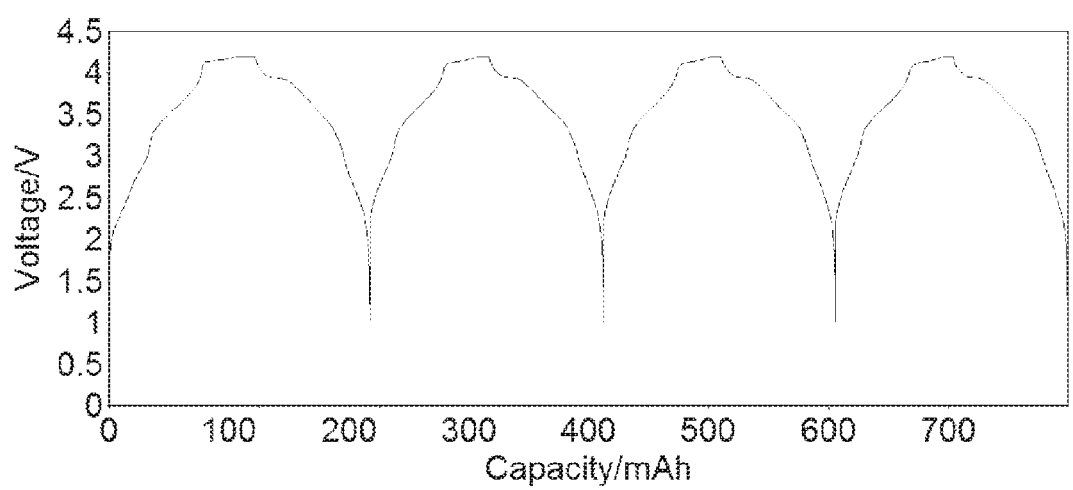
FIG. 4(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.25}Mn_{0.667}Mg_{0.083}O_2$ cell
Figure 4C:
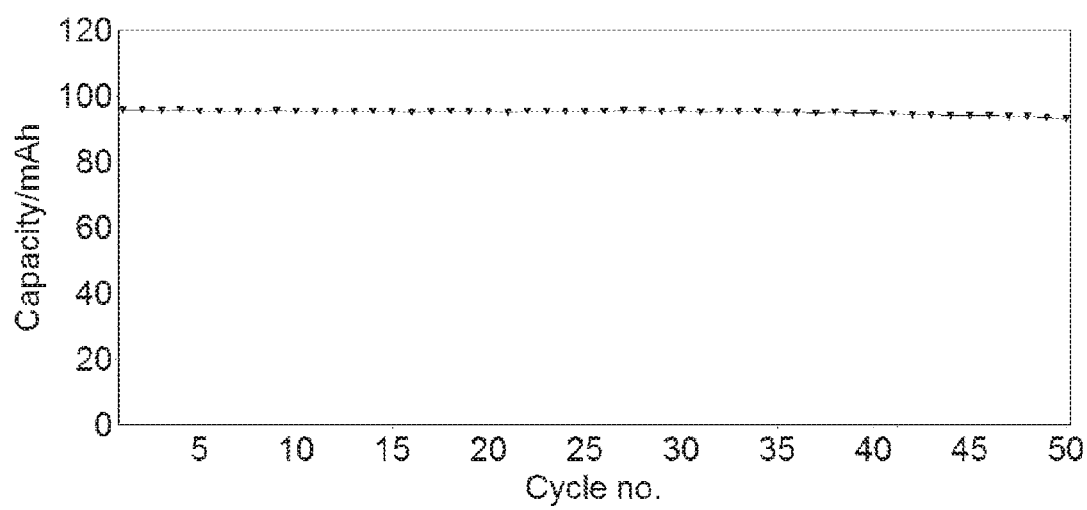
FIG. 4(C) shows the Constant current cycling (CC/CV) of full Na-ion Cell comprising hard carbon (Carbotron P(J) Kureha) and P2-$Na_{0.67}Ni_{0.25}Mn_{0.67}Mg_{0.083}O_2$ in the voltage range 1.0-4.2V at 30° C. in 0.5M $NaClO_4$-, propylene carbonate (PC) and GF/A.

Referring to FIGS. 4(B)-(C):

The data shown in FIGS. 4(B)-(C) are derived from the constant current cycling data for a P2-$Na_{0.67}Ni_{0.25}Mg_{0.083}Mn_{0.667}O_2$ cathode active material in a Na-ion cell (Cell#312020) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 4(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.25}Mg_{0.083}Mn_{0.667}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 4(C) shows the constant current cycle life profile (i.e. the relationship between Cathode Specific Capacity for Discharge [mAh/g] and cycle number for the Hard Carbon/P2-$Na_{0.67}Ni_{0.25}Mg_{0.083}Mn_{0.667}O_2$ cell. For cycle 1 the discharge specific capacity for the cathode is about 96 mAh/g. For cycle 30 the discharge specific capacity for the cathode is about 95 mAh/g. This represents a capacity fade of about 1.0% over 30 cycles or an average of 0.03% per cycle. The cathode material under test clearly demonstrates excellent capacity retention behaviour.

EXAMPLE 5:
P2-$Na_{0.67}Ni_{0.283}Mn_{0.567}Mg_{0.05}Ti_{0.1}O_2$

Figure 5A:
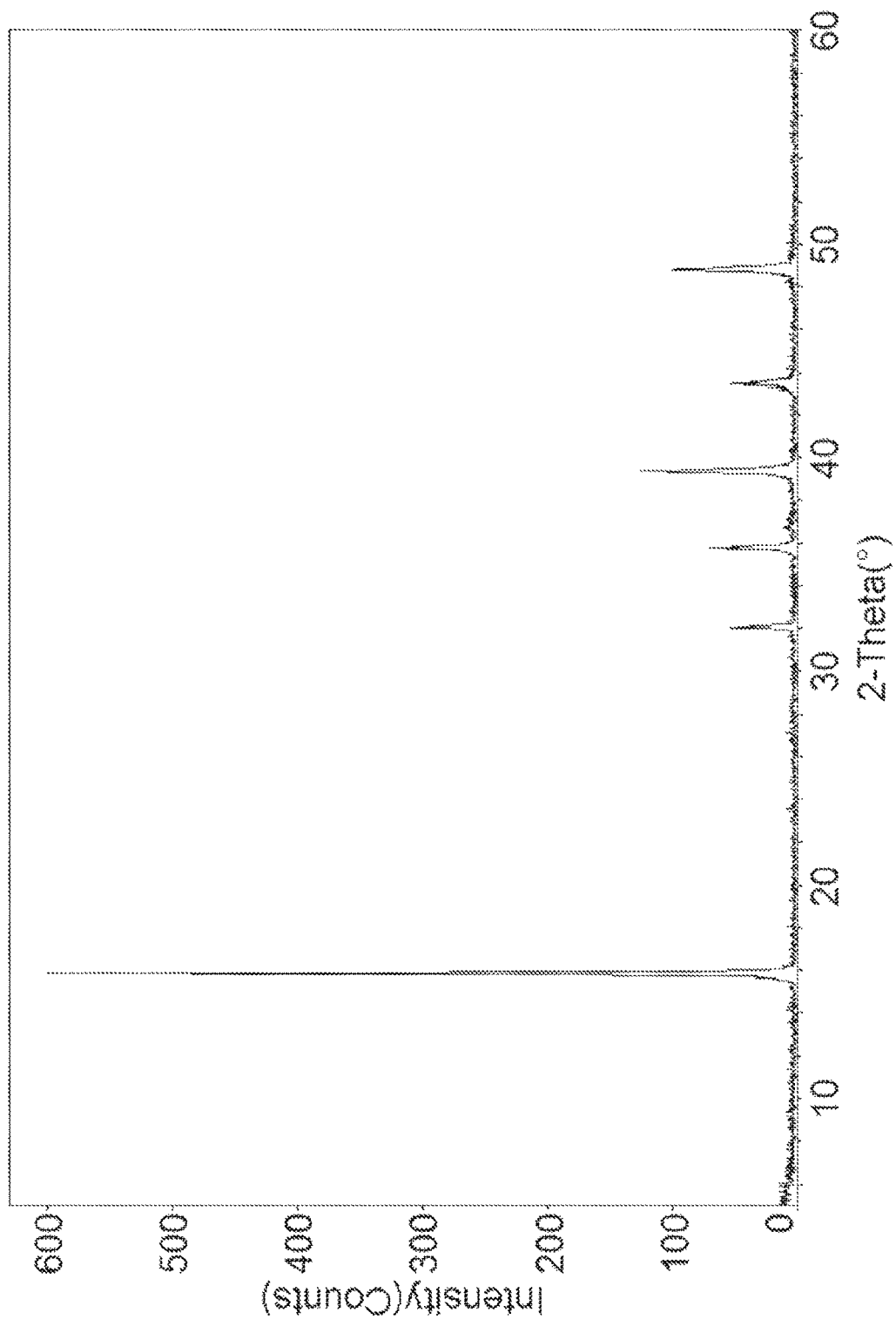
FIG. 5(A) is the XRD profile for the compound P2-$Na_{0.67}Ni_{0.283}Mn_{0.567}Mg_{0.05}Ti_{0.1}O_2$ (comparative material) used in Example 5.

FIG. 5(A) shows the X-ray diffraction pattern of $Na_{0.67}Ni_{0.283}Mn_{0.567}Mg_{0.05}Ti_{0.1}O_2$ (sample number X1713). The pattern shows that the sample conforms to a layered P2-type structure.

Figure 5B:
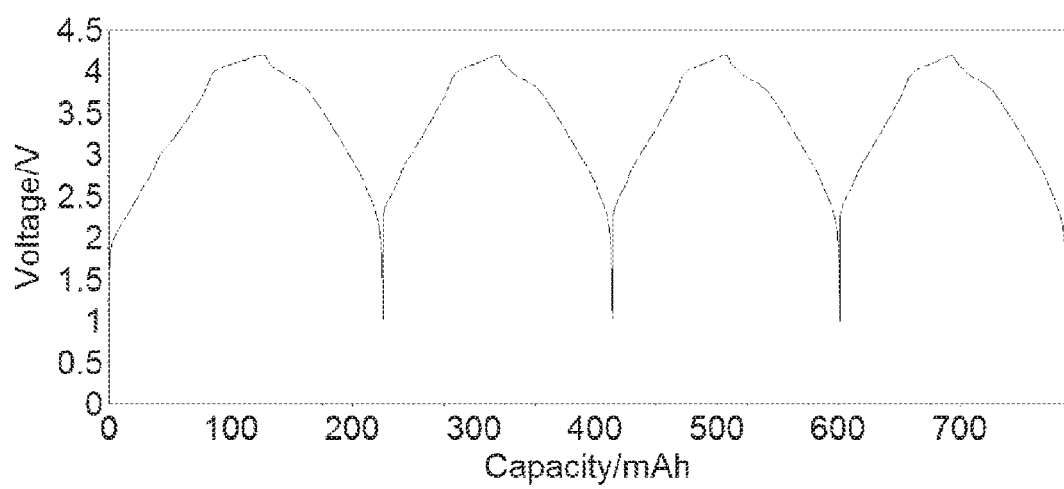
FIG. 5(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.283}Mn_{0.567}Mg_{0.05}Ti_{0.10}O_2$ cell.
Figure 5C:
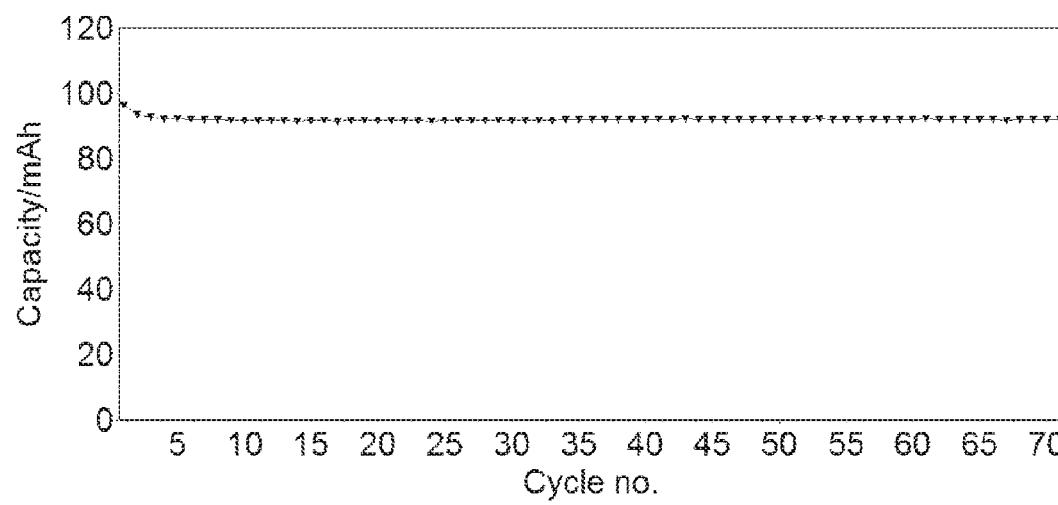
FIG. 5(C) shows the Constant current cycling (CC/CV) of full Na-ion Cell comprising hard carbon (Carbotron P(J) Kureha) and P2-$Na_{0.67}Ni_{0.283}Mn_{0.567}Mg_{0.05}Ti_{0.1}O_2$ in the voltage range 1.0-4.2V at 30° C. in 0.5M $NaClO_4$-, propylene carbonate (PC) and GF/A.

Referring to FIGS. 5(B)-(C):

The data shown in FIGS. 5(B)-(C) are derived from the constant current cycling data for a P2-$Na_{0.67}Ni_{0.283}Mn_{0.567}Mg_{0.05}Ti_{0.10}O_2$ cathode active material in a Na-ion cell (Cell#401018) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 5(B) shows the cell voltage profile (i.e. Na-ion Cell Voltage [V] versus Cumulative Cathode Specific Capacity [mAh/g]) for the first 4 charge/discharge cycles of the Hard Carbon/P2-$Na_{0.67}Ni_{0.283}Mn_{0.567}Mg_{0.05}Ti_{0.10}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 5(C) shows the constant current cycle life profile (i.e. the relationship between Cathode Specific Capacity for Discharge [mAh/g] and cycle number for the Hard Carbon/P2-$Na_{0.67}Ni_{0.283}Mn_{0.567}Mg_{0.05}Ti_{0.10}O_2$ cell. For cycle 1 the discharge specific capacity for the cathode is about 97 mAh/g. For cycle 30 the discharge specific capacity for the cathode is about 92 mAh/g. This represents a capacity fade of about 5.2% over 30 cycles or an average of 0.17% per cycle. The cathode material under test clearly demonstrates excellent capacity retention behaviour.

EXAMPLE 6:
O3-$Na_{0.95}Ni_{0.3167}Mn_{0.3167}Mg_{0.1583}Ti_{0.2083}O_2$

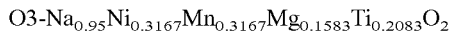

Figure 6A:
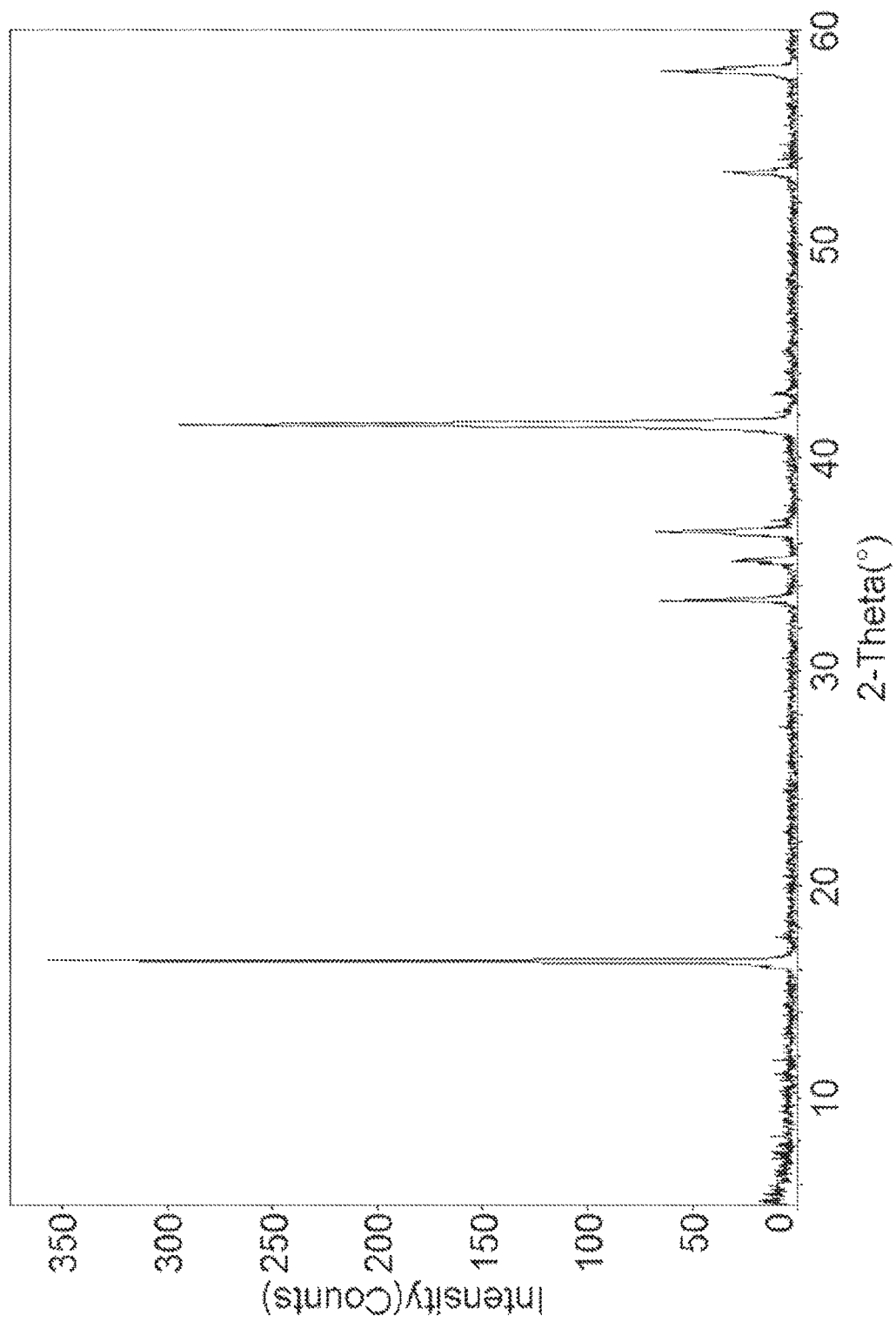
FIG. 6(A) is the XRD profile for the material O3-$Na_{0.95}Ni_{0.3167}Mn_{0.3167}Mg_{0.1563}Ti_{0.2083}O_2$ (comparative material) used in Example 6.

FIG. 6(A) shows the X-ray diffraction pattern of the known material $Na_{0.55}Ni_{0.3167}Mn_{0.3167}Mg_{0.1583}Ti_{0.2083}O_2$ (sample number X1714). The pattern shows that the sample conforms to a layered O3-type structure.

Figure 6B:
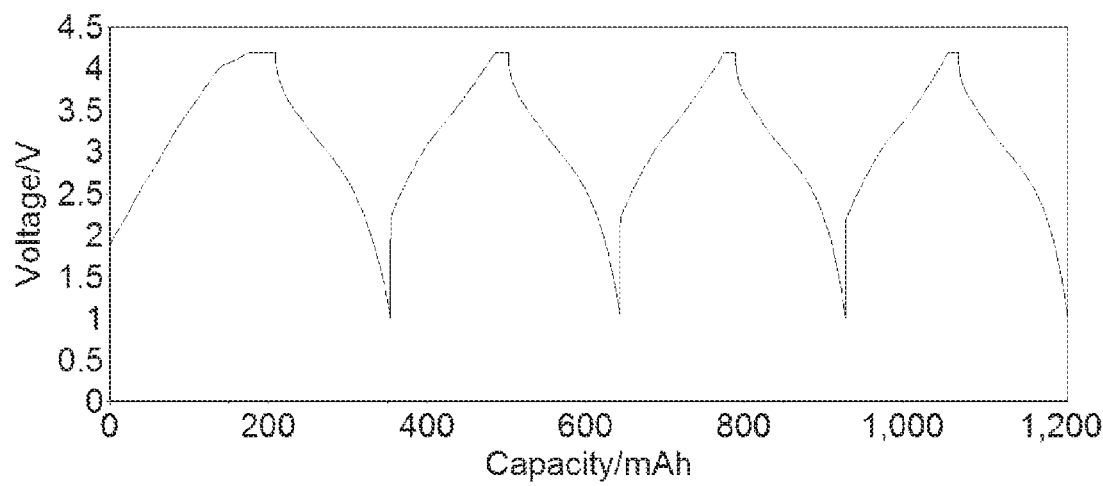
FIG. 6(B) shows the cell voltage profile (i.e. Na-ion Cell Voltage [V] versus Cumulative Cathode Specific Capacity [mAh/g]) for the first 4 charge/discharge cycles of the Hard Carbon/O3-$Na_{0.95}Ni_{0.3167}Mn_{0.3167}Mg_{0.1583}Ti_{0.2083}O_2$ cell.
Figure 6C:
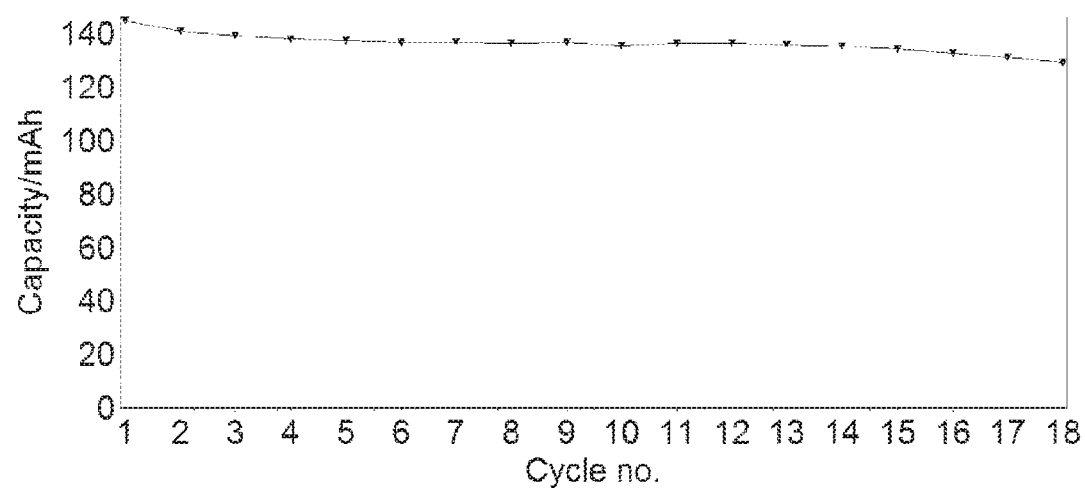
FIG. 6(C) shows the Constant current cycling (CC/CV) of full Na-ion Cell comprising hard carbon (Carbotron P(J) Kureha) and O3-$Na_{0.95}Ni_{0.3167}Mn_{0.3167}Mg_{0.1563}Ti_{0.2083}O_2$ in the voltage range 1.0-4.2V at 30° C. in 0.5M $NaClO_4$, propylene carbonate (PC) and GF/A.

Referring to FIGS. 6(B)-(C):

The data shown in FIGS. 6(B)-(C) are derived from the constant current cycling data for a O3-$Na_{0.95}Ni_{0.3167}Mn_{0.3167}Mg_{0.1583}Ti_{0.2083}O_2$ cathode active material in a Na-ion cell (Cell#401020) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm² between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 6(B) shows the cell voltage profile (i.e. Na-ion Cell Voltage [V] versus Cumulative Cathode Specific Capacity [mAh/g]) for the first 4 charge/discharge cycles of the Hard Carbon/O3-$Na_{0.95}Ni_{0.3167}Mn_{0.3167}Mg_{0.1583}Ti_{0.2083}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 6(C) shows the constant current cycle life profile (i.e. the relationship between Cathode Specific Capacity for Discharge [mAh/g] and cycle number for the Hard Carbon/O3-$Na_{0.95}Ni_{0.3167}Mn_{0.3167}Mg_{0.1583}Ti_{0.2083}O_2$ cell. For cycle 1 the discharge specific capacity for the cathode is about 145 mAh/g. For cycle 15 the discharge specific capacity for the cathode is about 134 mAh/g. This represents a capacity fade of about 7.6% over 15 cycles or an average of 0.51% per cycle. The cathode material under test demonstrates reasonable capacity retention behaviour.

EXAMPLE 7: 75 Mass % P2-$Na_{0.67}Ni_{0.283}Mn_{0.567}Mg_{0.05}Ti_{0.10}O_2$ and 25 Mass % O3-$Na_{0.95}Ni_{0.3167}Mn_{0.3167}Mg_{0.1583}Ti_{0.2083}O_2$

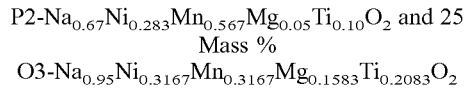

Figure 7A:
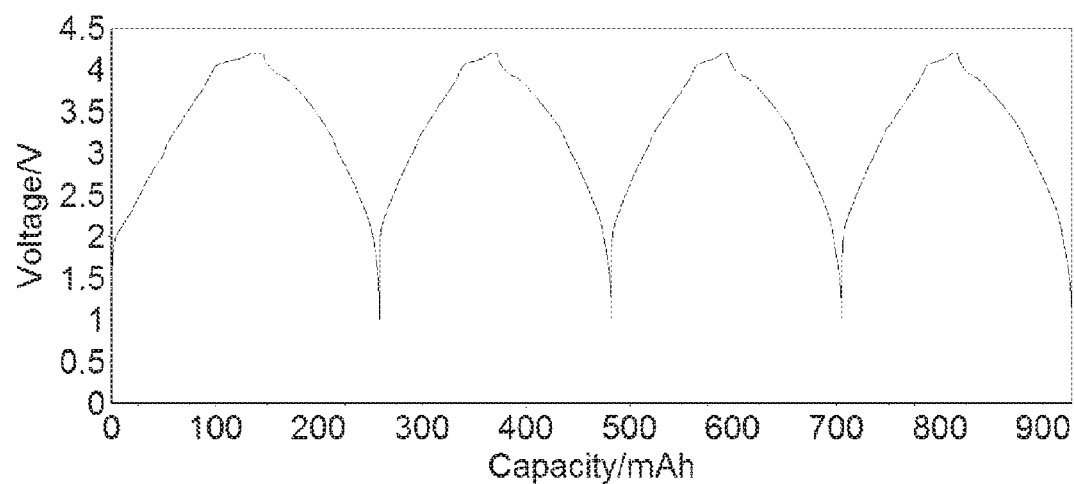
FIG. 7(A) shows the cell voltage profile (i.e. Na-ion Cell Voltage [V] versus Cumulative Cathode Specific Capacity [mAh/g]) for the first 4 charge/discharge cycles of the Hard Carbon/(75 mass % P2-$Na_{0.67}Ni_{0.283}Mn_{0.567}Mg_{0.05}Ti_{0.10}O_2$ and 25 mass % O3-$Na_{0.95}Ni_{0.3167}Mn_{0.3167}Mg_{0.183}Ti_{0.2083}O_2$) cell.
Figure 7B:
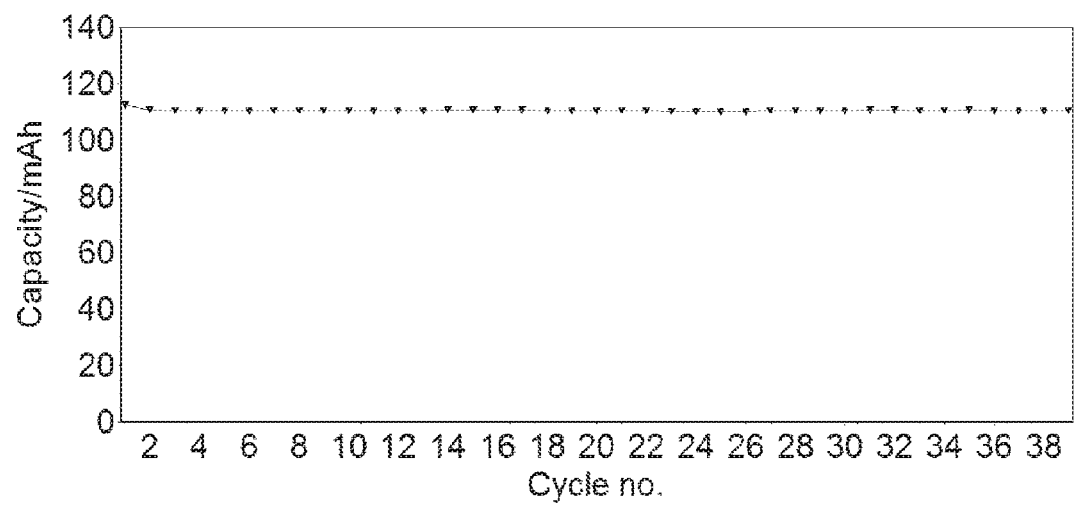
FIG. 7(B) shows the Constant current cycling (CC/CV) of full Na-ion Cell comprising hard carbon (Carbotron P(J) Kureha) and a doped nickelate-containing composition of the present invention comprising a physical mixture of P2-$Na_{0.67}Ni_{0.283}Mn_{0.567}Mg_{0.05}Ti_{0.1}O_2$ (75%) and O3-$Na_{0.95}Ni_{0.3167}Mn_{0.3167}Mg_{0.1563}Ti_{0.2083}O_2$ (25%) in the voltage range 1.0-4.2V at 30° C. in 0.5M $NaClO_4$ propylene carbonate (PC) and GF/A, as used in Example 7.

Referring to FIGS. 7(A)-(B).

The data shown in FIGS. 7(A)-(B) are derived from the constant current cycling data for a physically mixed active cathode comprising (75 mass % P2-$Na_{0.67}Ni_{0.283}Mn_{0.567}Mg_{0.05}Ti_{0.10}O_2$ and 25 mass % O3-$Na_{0.95}Ni_{0.3167}Mn_{0.3167}Mg_{0.1583}Ti_{0.2083}O_2$) in a Na-ion cell (Cell#401021) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm² between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 7(A) shows the cell voltage profile (i.e. Na-ion Cell Voltage [V] versus Cumulative Cathode Specific Capacity [mAh/g]) for the first 4 charge/discharge cycles of the Hard Carbon/(75 mass % P2-$Na_{0.67}Ni_{0.283}Mn_{0.567}Mg_{0.05}Ti_{0.10}O_2$ and 25 mass % O3-$Na_{0.95}Ni_{0.3167}Mn_{0.3167}Mg_{0.1583}Ti_{0.2083}O_2$) cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 7(B) shows the constant current cycle life profile (i.e. the relationship between Cathode Specific Capacity for Discharge [mAh/g] and cycle number for the Hard Carbon/(75 mass % P2-$Na_{0.67}Ni_{0.283}Mn_{0.567}Mg_{0.05}Ti_{0.10}O_2$ and 25 mass % O3-$Na_{0.95}Ni_{0.3167}Mn_{0.3167}Mg_{0.1583}Ti_{0.2083}O_2$). For cycle 1 the discharge specific capacity for the cathode is about 113 mAh/g. For cycle 15 the discharge specific capacity for the cathode is about 110 mAh/g. This represents a capacity fade of about 2.7% over 30 cycles or an average of 0.09% per cycle. The cathode material under test clearly demonstrates excellent capacity retention behaviour.

EXAMPLE 8: 50 Mass % P2-$Na_{0.67}Ni_{0.283}Mn_{0.567}Mg_{0.05}Ti_{0.10}O_2$ and 50 Mass % O3-$Na_{0.95}Ni_{0.3167}Mn_{0.3167}Mg_{0.1583}Ti_{0.2083}O_2$

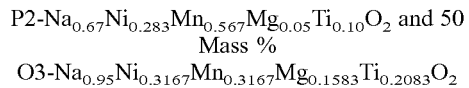

Figure 8A:
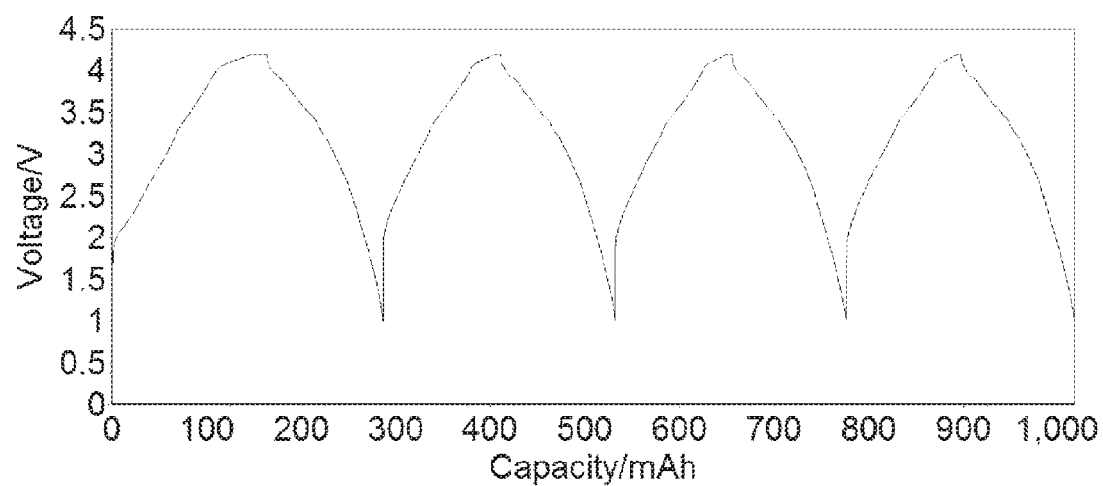
FIG. 8(A) shows the cell voltage profile (i.e. Na-ion Cell Voltage [V] versus Cumulative Cathode Specific Capacity [mAh/g]) for the first 4 charge/discharge cycles of the Hard Carbon/(50 mass % P2-$Na_{0.67}Ni_{0.283}Mn_{0.567}Mg_{0.05}Ti_{0.10}O_2$ and 50 mass % O3-$Na_{0.95}Ni_{0.3167}Mn_{0.3167}Mg_{0.1583}Ti_{0.2083}O_2$) cell.
Figure 8B:
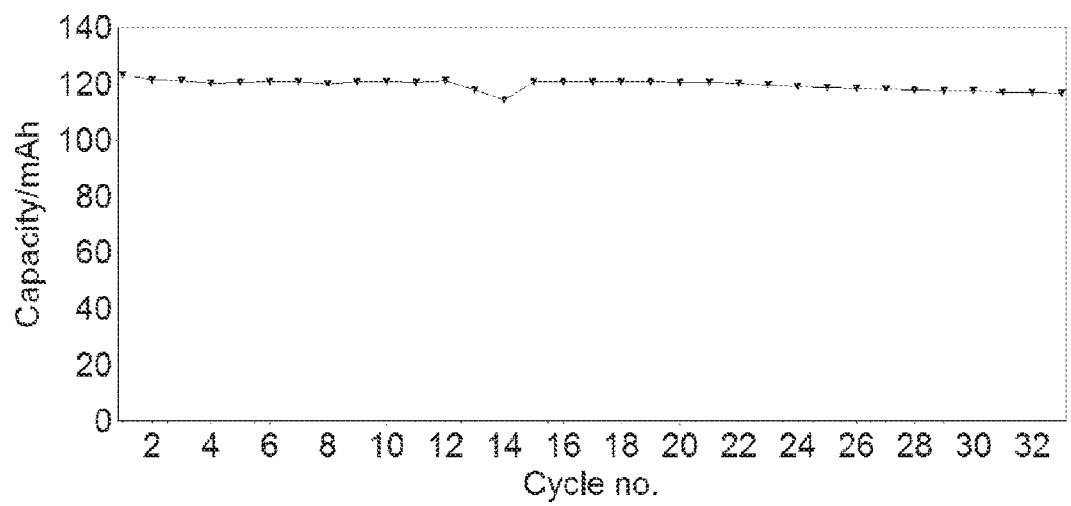
FIG. 8(B) shows the Constant current cycling (CC/CV) of full Na-ion Cell comprising hard carbon (Carbotron P(J) Kureha) and a doped nickelate-containing composition of the present invention comprising a physical mixture of P2-$Na_{0.67}Ni_{0.283}Mn_{0.567}Mg_{0.05}Ti_{0.1}O_2$ (50%) and O3-$Na_{0.95}Ni_{0.3167}Mn_{0.3167}Mg_{0.1563}Ti_{0.2083}O_2$ (50%) in the voltage range 1.0-4.2V at 30° C. in 0.5M $NaClO_4$, propylene carbonate (PC) and GF/A, as used in Example 8.

Referring to FIGS. 8(A)-(B):

The data shown in FIGS. 8(A)-(B) are derived from the constant current cycling data for a physically mixed active cathode comprising (50 mass % P2-$Na_{0.67}Ni_{0.283}Mn_{0.567}Mg_{0.05}Ti_{0.10}O_2$ and 50 mass % O3-$Na_{0.95}Ni_{0.3167}Mn_{0.3167}Mg_{0.583}Ti_{0.2083}O_2$) in a Na-ion cell (Cell#401023) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 8(A) shows the cell voltage profile (i.e. Na-ion Cell Voltage [V] versus Cumulative Cathode Specific Capacity [mAh/g]) for the first 4 charge/discharge cycles of the Hard Carbon/(50 mass % P2-$Na_{0.67}Ni_{0.283}Mn_{0.567}Mg_{0.05}Ti_{0.10}O_2$ and 50 mass % O3-$Na_{0.95}Ni_{0.3167}Mn_{0.3167}Mg_{0.1583}Ti_{0.283}O_2$) cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 8(B) shows the constant current cycle life profile (i.e. the relationship between Cathode Specific Capacity for Discharge [mAh/g] and cycle number for the Hard Carbon/ (50 mass % P2-$Na_{0.67}Ni_{0.23}Mn_{0.567}Mg_{0.05}Ti_{0.10}O_2$ and 50 mass % O3-$Na_{0.05}Ni_{0.3167}Mn_{0.3167}Mg_{0.583}Ti_{0.2083}O_2$). For cycle 1 the discharge specific capacity for the cathode is about 123 mAh/g. For cycle 15 the discharge specific capacity for the cathode is about 118 mAh/g. This represents a capacity fade of about 4.1% over 30 cycles or an average of 0.14% per cycle. The cathode material under test clearly demonstrates excellent capacity retention behaviour.

EXAMPLE 9: P2/O3-
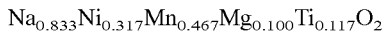

Figure 9A:
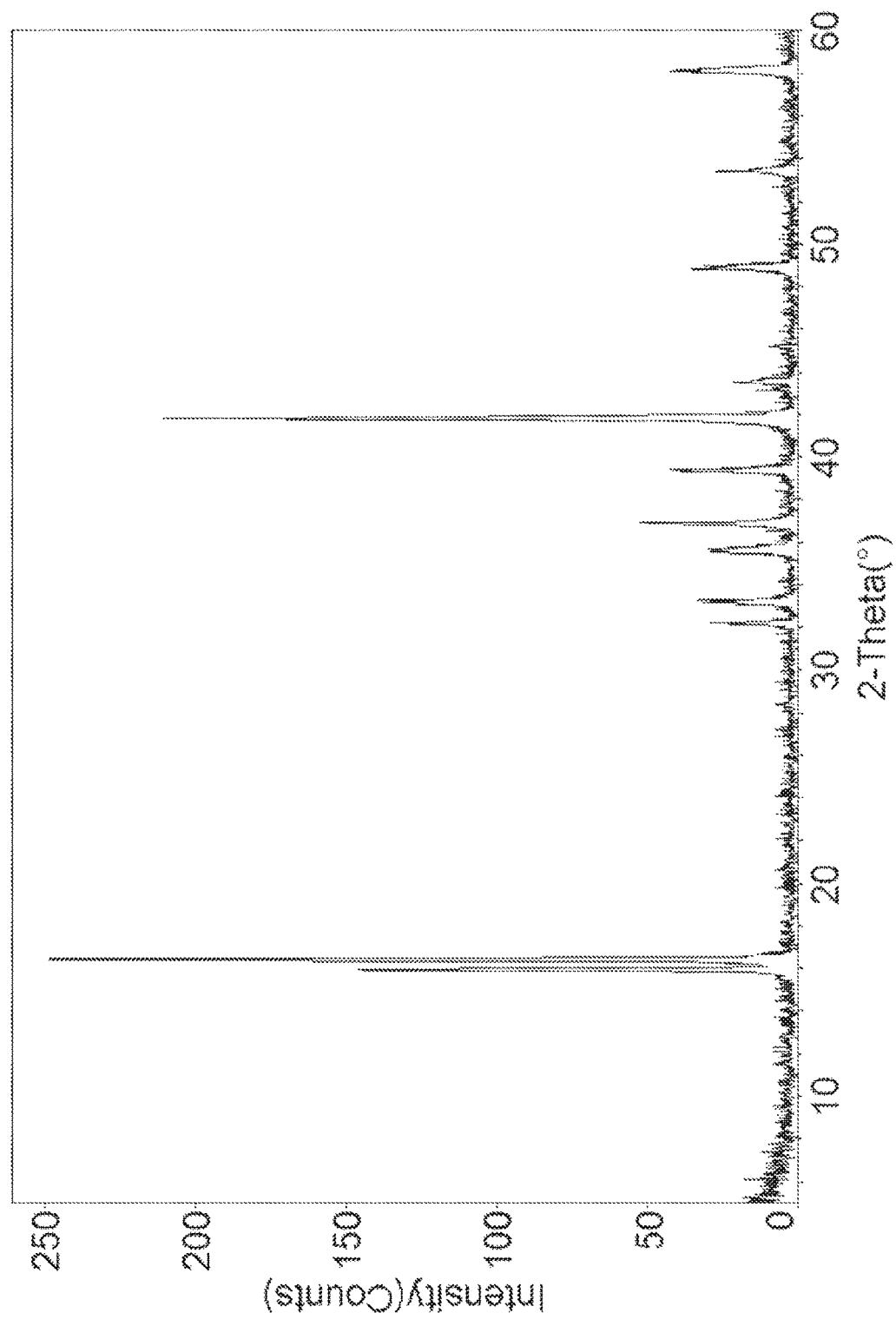
FIG. 9(A) is the XRD profile for the doped nickelate-containing composition of the present invention with the weighted average formula: O3/P2-$Na_{0.833}Ni_{0.317}Mn_{0.467}Mg_{0.1}Ti_{0.117}O_2$, as used in Example 9.

FIG. 9(A) shows the X-ray diffraction pattern of the weighted average formula $Na_{0.833}Ni_{0.317}Mn_{0.467}Mg_{0.100}Ti_{0.117}O_2$ (sample number X1682). The pattern shows the presence of both P2-type and O3-type structures.

Figure 9B:
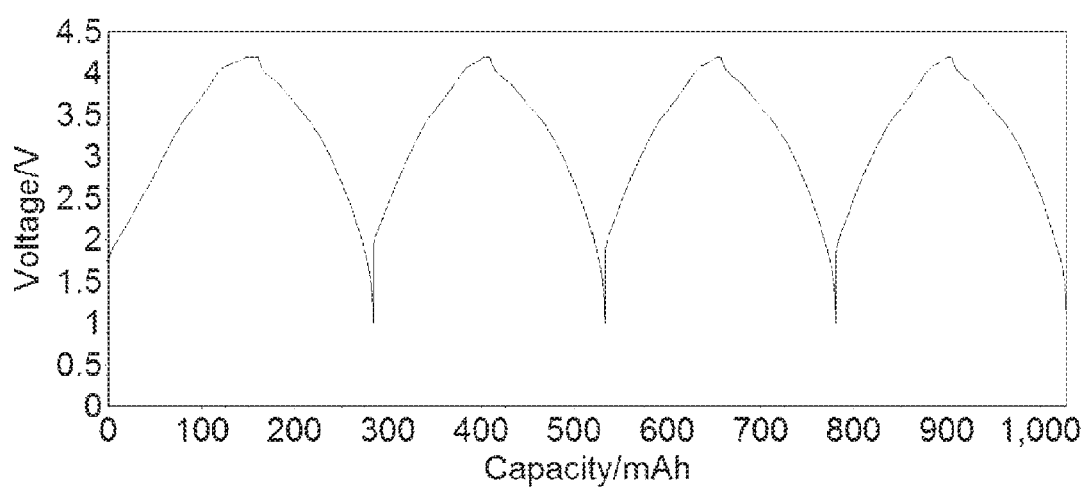
FIG. 9(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.833}Ni_{0.317}Mn_{0.467}Mg_{0.100}Ti_{0.117}O_2$ cell.
Figure 9C:
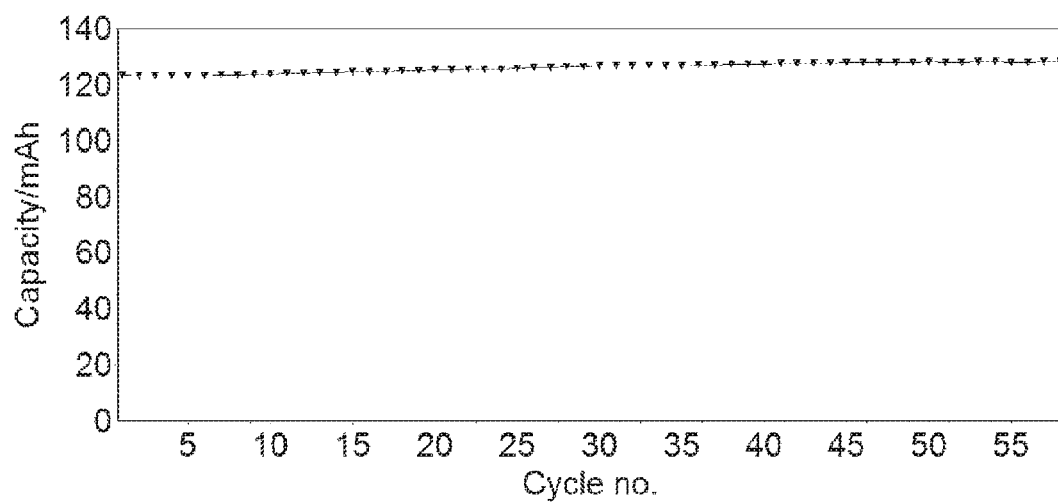
FIG. 9(C) shows the Constant current cycling (CC/CV) of full Na-ion Cell comprising hard carbon (Carbotron P(J) Kureha) and a doped nickelate-containing composition of the present invention with the weighted average formula: O3/P2-$Na_{0.833}Ni_{0.317}Mn_{0.467}Mg_{0.1}Ti_{0.117}O_2$ in the voltage range 1.0-4.2V at 30° C. in 0.5M $NaClO_4$, propylene carbonate (PC) and GF/A.

Referring to FIGS. 9(B)-(C):

The data shown in FIGS. 9(B)-(C) are derived from the constant current cycling data for a mixed phase O3/P2-$Na_{0.833}Ni_{0.317}Mn_{0.467}Mg_{0.100}Ti_{0.117}O_2$ cathode active material in a Na-ion cell (Cell#312017) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 9(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.833}Ni_{0.317}Mn_{0.467}Mg_{0.100}Ti_{0.117}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 9(C) shows the constant current cycle life profile (i.e. the relationship between Cathode Specific Capacity for Discharge [mAh/g] and cycle number for the Hard Carbon/ mixed phase O3/P2-$Na_{0.833}Ni_{0.317}Mn_{0.467}Mg_{0.100}Ti_{0.117}O_2$ cell. For cycle 1 the discharge specific capacity for the cathode is about 124 mAh/g. For cycle 30 the discharge specific capacity for the cathode is about 127 mAh/g. The cathode specific capacity has improved by around 2.4% over the first 30 cycles. The cathode material under test clearly demonstrates outstanding capacity retention behaviour.

EXAMPLE 10: P2/O3-
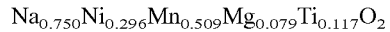

FIG. 10(A) shows the X-ray diffraction pattern of the weighted average formula $Na_{0.750}Ni_{0.296}Mn_{0.509}Mg_{0.079}Ti_{0.117}O_2$ (sample number X1692). The pattern shows the presence of both P2-type and O3-type structures.

Figure 10B:
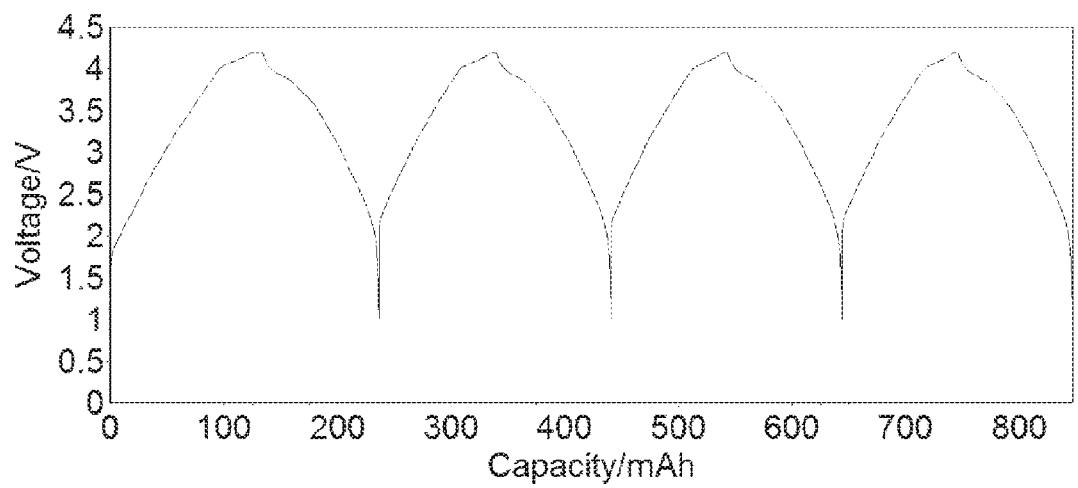
FIG. 10(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.753}Ni_{0.296}Mn_{0.509}Mg_{0.079}Ti_{0.117}O_2$ cell
Figure 10C:
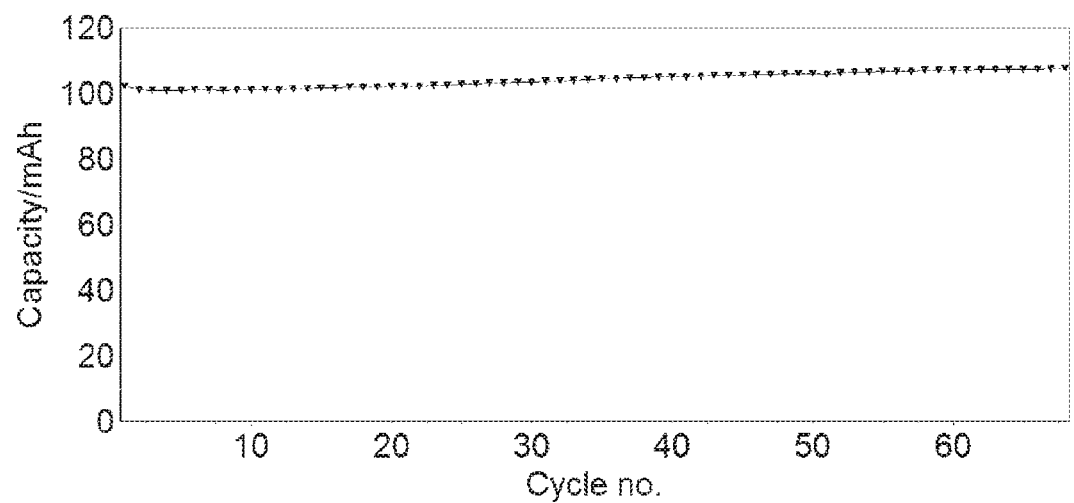
FIG. 10(C) shows the Constant current cycling (CC/CV) of full Na-ion Cell comprising hard carbon (Carbotron P(J) Kureha) and a doped nickelate-containing composition of the present invention with the weighted average formula.

Referring to FIGS. 10(B)-(C):

The data shown in FIGS. 10(B)-(C) are derived from the constant current cycling data for a mixed phase O3/P2-$Na_{0.753}Ni_{0.296}Mn_{0.509}Mg_{0.079}Ti_{0.117}O_2$ cathode active material in a Na-ion cell (Cell#401003) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 10(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.753}Ni_{0.296}Mn_{0.509}Mg_{0.079}Ti_{0.117}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 10(C) shows the constant current cycle life profile (i.e. the relationship between Cathode Specific Capacity for Discharge [mAh/g] and cycle number for the Hard Carbon/ mixed phase O3/P2-$Na_{0.753}Ni_{0.296}Mn_{0.509}Mg_{0.079}Ti_{0.117}O_2$ cell. For cycle 1 the discharge specific capacity for the cathode is about 103 mAh/g. For cycle 30 the discharge specific capacity for the cathode is about 104 mAh/g. The cathode specific capacity has improved by around 1% over the first 30 cycles. The cathode material under test clearly demonstrates outstanding capacity retention behaviour.

EXAMPLE 11: P2/O3-
$Na_{0.95}Ni_{0.3167}Mn_{0.3167}Mg_{0.1583}Ti_{0.2083}O_2$

FIG. 11(A) shows the X-ray diffraction pattern of the weighted average formula $Na_{0.95}Ni_{0.3167}Mn_{0.3167}Mg_{0.1583}Ti_{0.2083}O_2$ (sample number X1696C). The pattern shows the presence of both P2-type and O3-type structures.

Referring to FIGS. 11(B)-(C):

The data shown in FIGS. 11(B)-(C) are derived from the constant current cycling data for a mixed phase O3/P2-$Na_{0.95}Ni_{0.3167}Mn_{0.3167}Mg_{0.1583}Ti_{0.2083}O_2$ cathode active material in a Na-ion cell (Cell#401003) where this cathode material was coupled with a Hard Carbon (Carbotron P(J)) anode material. The electrolyte used was a 0.5 M solution of $NaClO_4$ in propylene carbonate. The constant current data were collected at an approximate current density of 0.125 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 11(B) shows the cell voltage profile (i.e. Na-ion Cell Voltage [V] versus Cumulative Cathode Specific Capacity [mAh/g]) for the first 4 charge/discharge cycles of the Hard Carbon/mixed phase O3/P2-$Na_{0.95}Ni_{0.3167}Mn_{0.3167}Mg_{0.1583}Ti_{0.2083}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 11(C) shows the constant current cycle life profile (i.e. the relationship between Cathode Specific Capacity for Discharge [mAh/g] and cycle number for the Hard Carbon/mixed phase O3/P2-$Na_{0.95}Ni_{0.3167}Mn_{0.3167}Mg_{0.1583}Ti_{0.2083}O_2$ cell. For cycle 1 the discharge specific capacity for the cathode is about 134 mAh/g. For cycle 30 the discharge specific capacity for the cathode is about 129 mAh/g. This represent a capacity fade of about 3.7% over 30 cycles or an average of 0.12% per cycle. The cathode material under test clearly demonstrates excellent capacity retention behaviour.

EXAMPLE 12: P2/O3-
$Na_{0.75}Ni_{0.296}Mn_{0.508}Mg_{0.079}Ti_{0.117}O_2$

FIG. 12(A) shows the X-ray diffraction pattern of the weighted average formula $Na_{0.75}Ni_{0.296}Mn_{0.508}Mg_{0.079}Ti_{0.117}O_2$ (sample number X1700). The pattern shows the presence of both P2-type and O3-type structures.

Referring to FIGS. 12(B)-(C):

The data shown in FIGS. 12(B)-(C) are derived from the constant current cycling data for a mixed phase O3/P2-$Na_{0.75}Ni_{0.296}Mn_{0.508}Mg_{0.079}Ti_{0.117}O_2$ cathode active material in a Na-ion cell (Cell#401014) where this cathode material was coupled with a Hard Carbon (Carbotron P(J)) anode material. The electrolyte used was a 0.5 M solution of $NaClO_4$ in propylene carbonate. The constant current data were collected at an approximate current density of 1.00 mA/cm$^2$ between voltage limits of 1.00 and 4.20 V. To ensure that the Na-ion cell was fully charged, the cell was potentiostatically held at 4.2 V at the end of the constant current charging process until the current density dropped to 10% of the constant current value. The testing was carried out at 30° C.

During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 12(B) shows the cell voltage profile (i.e. Na-ion Cell Voltage [V] versus Cumulative Cathode Specific Capacity [mAh/g]) for 4 charge/discharge cycles of the Hard Carbon/mixed phase O3/P2-$Na_{0.75}Ni_{0.296}Mn_{0.508}Mg_{0.079}Ti_{0.117}O_2$ cell. These data demonstrate that the level of voltage hysteresis (i.e. the voltage difference between the charge and discharge processes) is small, indicating the excellent kinetic reversibility of the Na-ion extraction-insertion reactions. In addition, the generally symmetrical nature of the charge/discharge voltage profile confirms the excellent reversibility of the extraction-insertion reactions.

FIG. 12(C) shows the constant current cycle life profile (i.e. the relationship between Cathode Specific Capacity for Discharge [mAh/g] and cycle number for the Hard Carbon/mixed phase O3/P2-$Na_{0.75}Ni_{0.296}Mn_{0.508}Mg_{0.079}Ti_{0.117}O_2$ cell. For cycle 1 the discharge specific capacity for the cathode is about 103 mAh/g. For cycle 200 the discharge specific capacity for the cathode is about 93 mAh/g. This represent a capacity fade of about 9.7% over 200 cycles or an average of 0.05% per cycle. The cathode material under test clearly demonstrates excellent capacity retention behaviour.

EXAMPLE 13: P3/P2-
$Na_{0.666}Ni_{0.3}Mn_{0.6}Mg_{0.033}Ti_{0.067}O_2$

FIG. 13 shows the X-ray diffraction pattern of the weighted average formula $Na_{0.666}Ni_{0.3}Mn_{0.6}Mg_{0.033}Ti_{0.067}O_2$ (sample number S0842). The pattern shows the presence of both P3-type and P2-type structures.

EXAMPLE 14: P3/P2-
$Na_{0.6667}Ni_{0.2500}Mn_{0.5833}Mg_{0.0833}Ti_{0.0833}O_2$

FIG. 14 shows the X-ray diffraction pattern of the weighted average formula $Na_{0.6667}Ni_{0.2500}Mn_{0.5833}Mg_{0.0833}Ti_{0.0833}O_2$ (sample number S1430A). The pattern shows the presence of both P3-type and P2-type structures.

EXAMPLE 15: P3/P2/O3-
$Na_{0.8292}Ni_{0.2886}Mn_{0.4622}Mg_{0.126}Ti_{0.1233}O_2$

FIG. 15 shows the X-ray diffraction pattern of the weighted average formula $Na_{0.8292}Ni_{0.2886}Mn_{0.4622}Mg_{0.126}Ti_{0.1233}O_2$ (sample number S1458B). The pattern shows the presence of P3-type, P2-type and O3-type structures.

EXAMPLE 16: P3/P2/O3-
$Na_{0.8188}Ni_{0.2860}Mn_{0.4561}Mg_{0.1234}Ti_{0.1346}O_2$

FIG. 16 shows the X-ray diffraction pattern of the weighted average formula $Na_{0.8188}Ni_{0.2860}Mn_{0.4561}Mg_{0.1234}Ti_{0.1346}O_2$ (sample number S1459B). The pattern shows the presence of P3-type, P2-type and O3-type structures.

The invention claimed is:

1. An electrode comprising a mixed-phase doped nickelate-containing composition comprising a first component type comprising one or more compounds with an O3 structure together with one or more component types selected from a second component-type comprising one or more components with a P2 structure, and a third component type comprising one or more components with a P3 structure, represented by a weighted average formula:

$$A'''_{a'''}M^{1'''}_{v'''}M^{2'''}_{w'''}M^{3'''}_{x'''}M^{4'''}_{y'''}M^{5'''}_{z'''}O_2$$

wherein:
A''' comprises one or more alkali metals selected from sodium, lithium and potassium;
$M^{1'''}$ is nickel in oxidation state 2+;
$M^{2'''}$ comprises one or more metals in oxidation state 4+;
$M^{3'''}$ comprises one or more metals in oxidation state 2+;
$M^{4'''}$ comprises one or more metals in oxidation state 4+; and
$M^{5'''}$ comprises one or more metals in oxidation state 3+;
wherein
$0.4 \leq a''' < 1$;
$0 < v''' < 0.5$;
at least one of w''' and y''' is >0;
$x''' \geq 0$;
$z''' \geq 0$;
wherein a''', v''', w''', x''', y''' and z''' are chosen to maintain electroneutrality.

2. An electrode according to claim 1 wherein the mixed phase doped nickelate-containing composition comprises either i) a single compound comprising discrete areas containing one or more components with an O3 structure, together with discrete areas of components with one or both of P2 and P3 structures, ii) a physical mixture comprising one or more compounds with an O3 structure together with one or more compounds with a P2 and/or a P3 structure, or iii) a mixture of i) and ii).

3. An electrode according to claim 1 wherein in the mixed-phase doped nickelate-containing composition x''' is >0.

4. An electrode according to claim 1, wherein in the mixed-phase doped nickelate-containing composition $M^{2'''}$ comprises one or more metals selected from manganese, titanium and zirconium; $M^{3'''}$ comprises one or more metals selected from magnesium, calcium, copper, zinc and cobalt; $M^{4'''}$ comprises one or more metals selected from manganese, titanium and zirconium; and $M^{5'''}$ comprises one or more metals selected from aluminium, iron, cobalt, molybdenum, chromium, vanadium, scandium and yttrium.

5. An electrode according to claim 1 wherein the mixed-phase doped nickelate-containing composition has a weighted average formula selected from:

$O3/P2-Na_{0.833}Ni_{0.317}Mn_{0.467}Mg_{0.100}Ti_{0.117}O_2$, $O3/P2-Na_{0.750}Ni_{0.296}Mn_{0.508}Mg_{0.079}Ti_{0.117}O_2$, $O3/P2-Na_{0.85}Ni_{0.4}Mn_{0.5}Mg_{0.025}Ti_{0.07502}$, $O3/P2-Na_{0.95}Ni_{0.3167}Mn_{0.3167}Mg_{0.1583}Ti_{0.2083}O_2$, $O3/P2-Na_{0.8}Ni_{0.2667}Mn_{0.2667}Mg_{0.1333}Ti_{0.3333}O_2$, $O3/P2-Na_{0.75}Ni_{0.25}Mn_{0.25}Mg_{0.125}Ti_{0.375}O_2$, $O3/P2-Na_{0.7}Ni_{0.2333}Mn_{0.2333}Mg_{0.1167}Ti_{0.4167}O_2$.

6. An application device comprising the electrode according to claim 1.

7. An application device comprising an electrode according to claim 6, wherein the device is selected from an energy storage device, a battery, a rechargeable battery, an electrochemical device, an electrochromic device and a Na-ion cell.

8. A process for preparing the doped nickelate-containing composition according to claim 1 comprising forming a physical mixture of the one or more components of the first component-type, with the one or more components of one or both of the second and third component-types.

9. A process for preparing the doped nickelate-containing composition according to claim 1, comprising the steps of:
i) mixing together starting materials selected from precursors for the one or more components of the first and second and/or third component-types, optionally in combination with one or more ready-made components of one or more of the first, second and third component types;
ii) pressing the mixed starting materials into a pellet; and
iii) heating the resulting pelletised mixture under a suitable atmosphere, and at a temperature for example of between 400° C. and 1500° C. until the doped nickelate-containing reaction product forms.

* * * * *